US012769516B2

(12) United States Patent
Weis et al.

(10) Patent No.: US 12,769,516 B2
(45) Date of Patent: Oct. 20, 2026

(54) METHOD AND SYSTEM FOR DYNAMIC CONFIGURATION OF A POLICY MODEL AS A DYNAMIC AUTHORIZATION IMPLEMENTATION

(71) Applicant: PERMIT IO LTD., Tel Aviv (IL)

(72) Inventors: Or Weis, Tel-Aviv (IL); Asaf Cohen, Ramat Gan (IL)

(73) Assignee: PERMIT IO LTD, Tel Aviv (IL)

( * ) Notice: Subject to any disclaimer, the term of this patent is extended or adjusted under 35 U.S.C. 154(b) by 466 days.

(21) Appl. No.: 18/225,389

(22) Filed: Jul. 24, 2023

(65) Prior Publication Data

US 2024/0094993 A1 Mar. 21, 2024

Related U.S. Application Data

(60) Provisional application No. 63/406,802, filed on Sep. 15, 2022.

(51) Int. Cl.

*G06F 9/44* (2018.01)
*G06F 8/30* (2018.01)
*G06F 9/445* (2018.01)
*G06F 9/45* (2006.01)
*G06F 9/455* (2018.01)
*G06F 21/60* (2013.01)

(52) U.S. Cl.

CPC .............. *G06F 8/30* (2013.01); *G06F 21/604* (2013.01)

(58) Field of Classification Search

CPC ................................ G06F 8/30; G06F 21/604
See application file for complete search history.

(56) References Cited

U.S. PATENT DOCUMENTS

| | | | | |
|---|---|---|---|---|
| 11,169,823 | B2 * | 11/2021 | Alabes | G06F 9/4451 |
| 11,516,220 | B1 * | 11/2022 | Singh | G06F 21/604 |
| 11,853,463 | B1 * | 12/2023 | Hinrichs | H04L 63/0807 |
| 2015/0269383 | A1 * | 9/2015 | Lang | G06F 21/57 726/1 |
| 2018/0309790 | A1 * | 10/2018 | Johnson | H04L 63/20 |
| 2018/0316676 | A1 * | 11/2018 | Gilpin | H04L 9/0891 |
| 2021/0365571 | A1 * | 11/2021 | Sandall | G06F 21/53 |

(Continued)

OTHER PUBLICATIONS

Sabrina Sicari, Dynamic Policies in Internet of Things: Enforcement and Synchronization, 2017, pp. 1-11. https://ieeexplore.ieee.org/stamp/stamp.jsp?tp=&arnumber=8027013 (Year: 2017).*

(Continued)

*Primary Examiner* — Mongbao Nguyen
(74) *Attorney, Agent, or Firm* — PEARL COHEN LLP

(57) ABSTRACT

A method and system for a dynamic configuration of a policy model as a dynamic authorization implementation including a Resource Action Inventory Interface, a Data-Source Integration Interface, a Policy-Sets Interface and a Permissions Interface, wherein an author dynamically creates one or more policies for an application and generates a dynamic authorization implementation. The dynamic authorization implementation is a policy code and/or a policy graph schema. A further method includes the transition from a RBAC policy to an ABAC policy for an application and the generation of a dynamic authorization assignment as a policy code and/or policy graph schema.

19 Claims, 17 Drawing Sheets

(56) References Cited

U.S. PATENT DOCUMENTS

| | | | | |
|---|---|---|---|---|
| 2022/0086189 A1* | 3/2022 | Nguyen | H04L 63/20 | |
| 2023/0122504 A1* | 4/2023 | Sharma | H04L 63/102 | 726/4 |

OTHER PUBLICATIONS

Bill Tarr, Isolating SaaS Tenants with Dynamically Generated IAM Policies, 2020, pp. 1-14. https://aws.amazon.com/blogs/apn/isolating-saas-tenants-with-dynamically-generated-iam-policies/ (Year: 2020).*
Dakshi Agrawal, Policy-Based Management of Networked Computing Systems, 2005, pp. 69-75. https://ieeexplore.ieee.org/stamp/stamp.jsp?tp=&arnumber=1522127 (Year: 2005).*
Role-based access control; https://en.wikipedia.org/wiki/Role-based_access_control, printed Jun. 26, 2023.
Attribute-based access control; https:/en.wikipedia.org/wiki/Attribute-based_access_control, printed Jan. 6, 2023.
Open Policy Agent; https://www.openpolicyagent.om/, printed Jun. 26, 2023.
Zanzibar: Google's Consistent, Global Authorization System; https://research.google/pubs/pub48190/, printed Jun. 26, 2023.
Spice Database—Open Source, Google Zanzibar-inspired fine-grained permissions database; https://research.google/pubs/pub48190/, printed Jun. 26, 2023.
OPAL + OPA VS XACML; https://www.permit.io/blog/opal-opa-vs-xacml, printed Jun. 26, 2023.
OPAL Open-Policy Administration Layer; https://www.opal.ac/, printed Jun. 26, 2023.

* cited by examiner

FIG. 4
Add Data Source Button
401
Data source:
Data source name
Type: [one of Identity, Input, external ]
Attributes:
Add Attributes Button
405
Attribute name 1 , Attribute type 1
Attribute name 2, Attribute type 2
402
403
404

METHOD AND SYSTEM FOR DYNAMIC CONFIGURATION OF A POLICY MODEL AS A DYNAMIC AUTHORIZATION IMPLEMENTATION

CROSS-REFERENCE TO RELATED APPLICATIONS

This application claims the benefit of priority of U.S. Provisional Patent Application No. 63/406,802, titled METHOD AND SYSTEM FOR DYNAMIC CONFIGURATION OF A POLICY MODEL AS A DYNAMIC AUTHORIZATION IMPLEMENTATION, filed Sep. 15, 2022, the contents of which are incorporated herein by reference in their entirety.

TECHNICAL FIELD OF THE INVENTION

The present invention relates generally to the configuration of a policy model as a dynamic authorization implementation, e.g. as policy code or policy graph schema, in particular to a software providing an interface that enables the dynamic creation of a policy model, e.g. attributed based access control policy, and their transformation into policy code that can be run on various software platforms or policy graph schema that can be loaded and used as a policy data model.

BACKGROUND OF THE INVENTION

In the world of modern software and Identity Access Management, authors of software policies, e.g. software developers are required to include access control aspects in every component of a software solution, for example to enable additional stakeholders working on a product, service or application (e.g. product managers, security, compliance, sales, support), as well as the end customer themselves to be able to take part, affect, manage access, and apply checks and balances to the product within a set of defined rules and policies.

A key part of any product's access control solution is its policy. The access policy, or set of rules defines which users can use a certain product and further defines the way in which users, for example a customer, a developer or an administrator can access certain products or their features. Commonly, the access policy is based on models, for example Role Based Access Control (RBAC), Attribute Based Access Control (ABAC), and Relationship Based Access Control (ReBAC). Among the most common access control solutions is ABAC being one of the most advanced and most complex.

Authors of policies, e.g. developers, often want to start with simpler models, representing them as code. With time, authors find themselves evolving the solution towards more complex models and specifically ABAC gradually. However, the gradual evolution, and the sheer baseline complexity of ABAC make it hard for authors, e.g. developers, to create, manage, and collaborate on policies with other stakeholders.

Thus, there is a need to provide for a system comprising an interface that allows an author to create policies or procedure documents and convert them into policy code or policy graph schema.

SUMMARY OF THE INVENTION

The following is a simplified summary providing an initial understanding of the invention. The summary does not necessarily identify key elements nor limit the scope of the invention, but merely serves as an introduction to the following description.

Embodiments of the present invention may provide a system and a method for a dynamic configuration of a policy model as a dynamic authorization implementation. A dynamic authorization implementation may be a policy code and/or a policy graph schema.

In further embodiments, the present invention may identify a system and a method that provides authors with interfaces, for example a user interface (UI) or an application programming interface (API), to define policies, and have policy code and/or policy graph schema generated via the software of a system disclosed herein. Policy code and/or policy graph schema may be defined for audiences, e.g. into best practice code repositories and pipelines, thereby enabling an efficient policy creation and management.

According to a first aspect, an embodiment of the present invention may provide a system for a dynamic configuration of a policy model as a dynamic authorization implementation, the system comprising: a computer processor; a Resource Action Inventory Interface, configured to receive one or more layout elements for an application from an author; a Data-Source Integration Interface, configured to receive one or more data sources from the author; a policy-sets interface, configured receive one or more rules from the author; and a Permissions Interface, configured to receive an assignment of dynamically configurable permissions from the author, wherein at least one of: the Resource Action Inventory Interface, the Data-Source Integration Interface, the Policy-Sets Interface, and the Permissions Interface, generate a set of instructions that, when executed, cause the computer processor to: receive one or more layout elements for an application from the author at the Resource Action Inventory Interface; map a layout of the application from the one or more layout elements received at the Resource Action Inventory Interface; receive one or more data sources from the author at the Data-Source Integration Interface; identify one or more attributes in data present in the one or more data sources; generate a Policy-Sets Interface based on the identified one or more attributes; receive one or more rules from the author at the policy-sets interface; create one or more policy sets from the one or more rules received at the Policy-Set Interface; receive an assignment of dynamically configurable permissions from the author for the one or more policy sets at the Permissions Interface; evaluate the one or more policy sets using the dynamically configurable permissions to identify one or more dynamically permitted policy sets; apply the one or more dynamically permitted policy sets to the layout of the application at the Permissions Interface; and generate the dynamic authorization implementation.

According to an another aspect, an embodiment of the present invention may identify a method for dynamically configurating of a policy as a dynamic authorization implementation, the method comprising: receiving one or more layout elements for an application from an author at the Resource Action Inventory Interface; mapping a layout of the application from the one or more layout elements received at the Resource Action Inventory Interface; receiving one or more data sources from the author at the Data-Source Integration Interface; identifying one or more attributes in data present in the one or more data sources; generating a Policy-Sets Interface based on the identified one or more attributes; receiving one or more rules from the author at the policy-sets interface; creating one or more policy sets from the one or more rules received at the Policy-Set Interface; receiving an assignment of dynamically configurable permissions from the author for the one or more policy sets at the Permissions Interface; evaluating the one or more policy sets using the dynamically configurable permissions to identify one or more dynamically permitted policy sets; applying the one or more dynamically permitted policy sets to the layout of the application at the Permissions Interface; and generating a of a policy as a dynamic authorization implementation.

In another embodiment of the present invention, the one or more layout elements may be one or more of: resources; identities; and actions.

In another embodiment of the present invention, the policy may be a Role Based Access Control (RBAC) policy, Attribute Based Access Control (ABAC), and Relationship Based Access Control (ReBAC).

In another embodiment of the present invention, the dynamic authorization implementation may be one or more of: policy code; and policy graph schema.

In yet another embodiment of the present invention, the step of receiving one or more rules from the author at the Policy-Sets Interface to create one or more policy sets, may comprise assigning one or more attributes to one or more layout elements by an author.

In another embodiment of the present invention, the layout elements and attributes may be within the limits of a policy.

In yet another embodiment of the present invention, the one or more layout elements, one or more identities and/or one or more attributes may be used as part of the Policy-Sets Interface.

In an embodiment of the present invention, the one or more actions may be selected from a group consisting of: create, read, update and delete.

In yet another embodiment of the present invention, the policy code may be configured to run on multiple software programs for decision making and enforcement.

In yet another embodiment of the present invention, the policy code and/or policy graph schema, and the one or more attributes may be stored in a source control solution, e.g. a Git repository.

These, additional, and/or other aspects and/or advantages of the present invention may be set forth in the detailed description which follows; possibly inferable from the detailed description; and/or learnable by practice of the present invention.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings:

DETAILED DESCRIPTION OF EMBODIMENTS OF THE INVENTION

Figure 1:
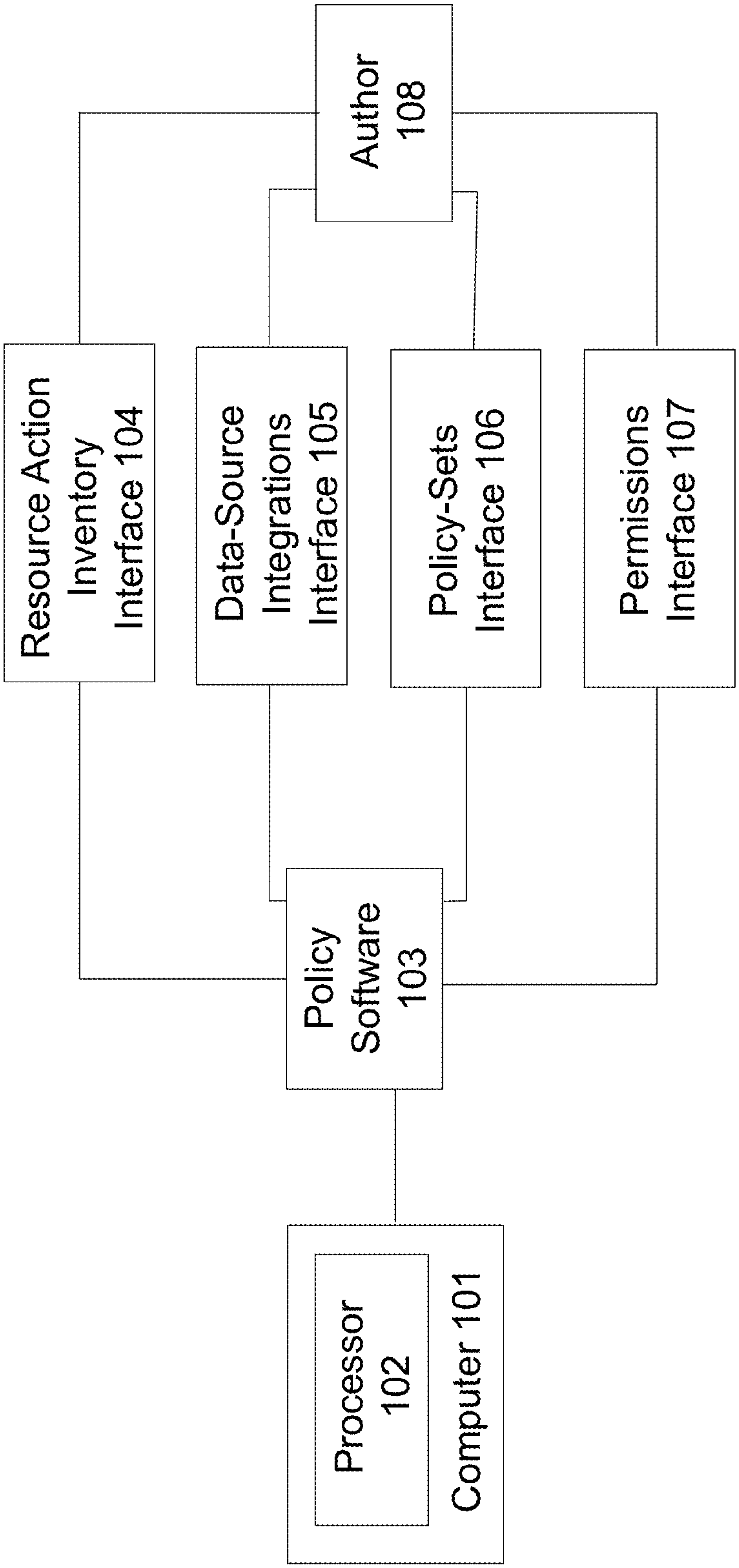
FIG. 1 is a block diagram of a system for a dynamic configuration of a policy, e.g. attributed based access control policy, as a dynamic authorization implementation, according to an embodiment of the present invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

FIG. 1 is an illustration of a system according to an embodiment of the present invention. An author 108 may interact with a policy software 103 of the system executed on computer 101 using processor 102 via software interfaces of the policy software 103. For example, author 108 may a person that manages access and specifies policies for a software solution.

The term "author" may further refer to a person that uses a system or carries out steps of a method of the present invention with the intention to generate a policy model for an application and to configure a policy model for an application as source code and/or policy graph schema. An author 108 may be, for example, a developer, a stakeholder, administrator or a customer of a software solution. An "application" may be a product or service (e.g. a software product) for which an author generates a policy model.

The terms "user" or "subject" may refer to a person for which a policy according to the present invention is implemented. A "user" or "subject" may be a developer, a stakeholder, an automated service, administrator or a customer of a software solution or any other authenticated identity.

Expertise in Identity Access Management and policy configuration might vary between different authors. For example, a customer of a software solution might be interested in providing access to certain parts of a software solution to their clients, but might have a limited experience in Identity Access Management and policy configuration with regards to another author such as a software developer.

Hence, disclosed herein is a system for Identity Access Management and dynamic configuration of a policy, in particular the generation of policy code or policy graph schema, e.g. based on an attribute based access control (ABAC policy).

Specifically, policies created via an interface of the system disclosed herein (e.g. a user interface (UI) or an application programming interface (API)) may be translated into policy code that can be run on a policy software and/or policy graph schema that can be loaded and used as a policy data model. A policy software may be a software that allows a subject, e.g. an administrator, software developer or an organization, to create, monitor and enforce rules about how network resources or data, e.g. a software products or the administrator's, software developer's or an organization's data can be accessed.

The system disclosed herein may be used by authors such as software developers, but also authors with a limited proficiency in policy allocation or software developing experience.

As detailed in FIG. 1, the system according to embodiments of the present invention may include policy software 103 executed by processor 102 of computer 101.

An author 108 may access and interact with policy software 103 via Resource Action Inventory Interface 104. Alternatively, author 108 may access and interact with policy software 103 via Data-Source Integration Interface 105. Alternatively, author 108 may access and interact with policy software 103 via Policy-Sets Interface 106. Alternatively, author 108 may access and interact with policy software 103 via Permissions Interface 107.

Interfaces 104, 105, 106 and 107 may allow author 108 to define policies using policy software 103 for subjects. Interfaces 104, 105, 106 and 107 may allow author 108 to dynamically amend policies for subjects. Further, Interfaces 104, 105, 106 and 107 may allow author 108 to generate policy data, policy code or policy graph schema from permission assignments.

Resource Action Inventory Interface 104 may be configured to receive one or more layout elements from author 108. Data-Source Integration Interface 105 may be configured to receive one or more data sources from author 108. Policy-Sets Interface 106 may be configured to receive one or more rules from author 108. Permissions Interface 107 may be configured to receive an assignment of dynamically configurable permissions from author 108.

Data received via each Resource Action Inventory Interface 104, Data-Source Integration Interface 105, Policy-Sets Interface 106 and/or Permissions Interface 107 may be stored as code in a programming language, e.g. JavaScript Object Notation (JSON), in storage of computer 101. Storage of computer 101 may be memory storage, an external storage device that can be accessed during the compilation of dynamic authorization implementation as a policy code and/or a policy graph schema. In addition, data from data sources, e.g. databases or external web services, may be introduced using Data-Source Integration Interface 105. Data-Source Integration Interface 105 may further enable to access data introduced using Data-Source Integration Interface 105 within a Resource Action Inventory Interface 104, Policy-Sets Interface 106 and/or Permissions Interface 107.

Policy software 103 may access code and data received via Interfaces 104-107. Policy software 103 may further generate a dynamic authorization implementation, e.g. a policy code or a policy graph schema, from code and data received via Interfaces 104-107.

Figure 2:
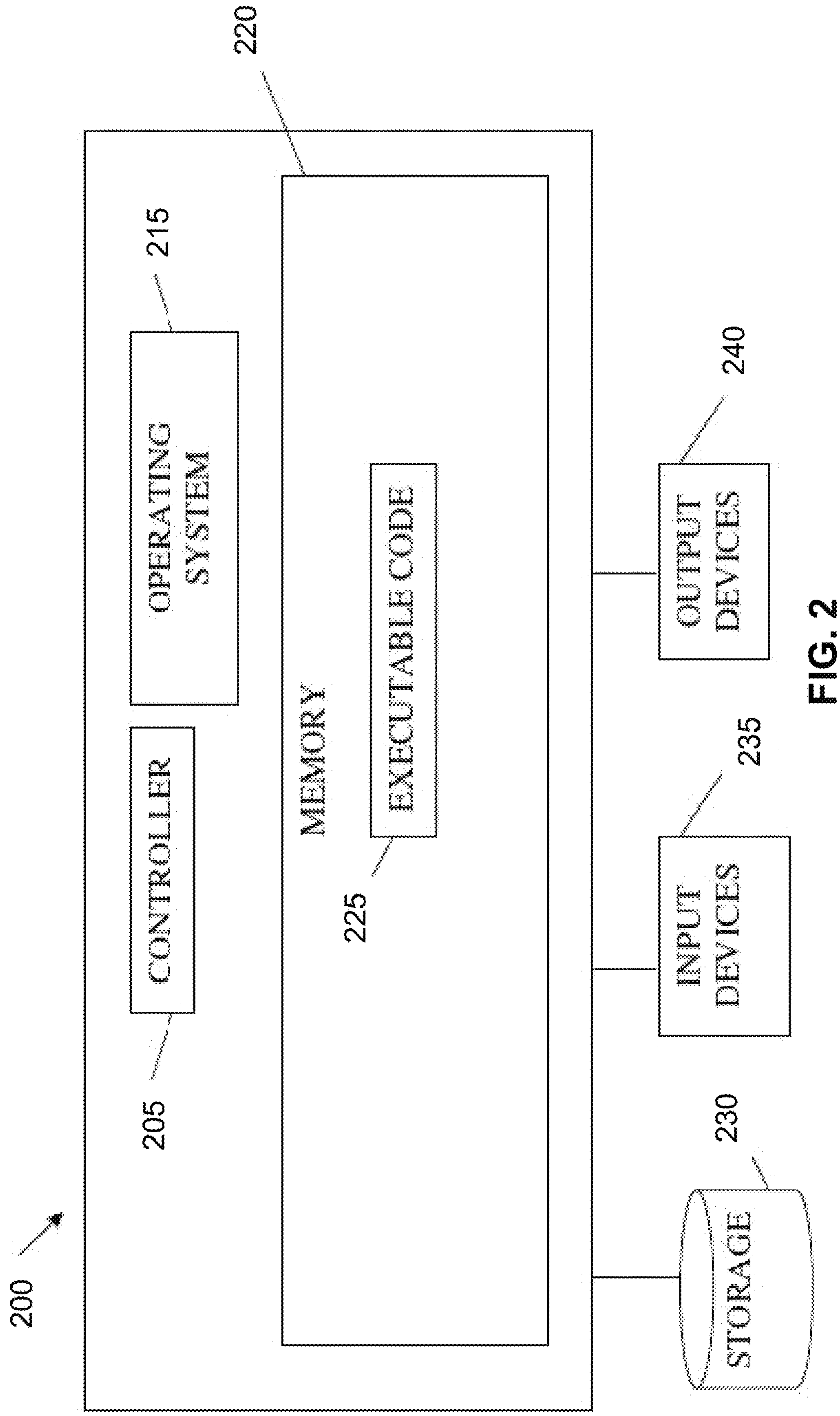
FIG. 2 shows a high-level block diagram of an exemplary computing device which may be used with embodiments of the present invention.

The computer may be a computer system for example as shown in FIG. 2. FIG. 2 shows a high-level block diagram of an exemplary computing device which may be used with embodiments of the present invention. Computing device 200 may include a controller or computer processor 205 that may be, for example, a central processing unit processor (CPU), a chip or any suitable computing device, an operating system 215, a memory 220, a storage 230, input devices 235 and output devices 240 such as a computer display or monitor displaying for example a computer desktop system. Each of modules and equipment such as Internet browsers, software programs computer desktop system, servers, server software and other modules discussed herein may be or include, or may be executed by, a computing device such as included in FIG. 2, although various units among these modules may be combined into one computing device.

Operating system 215 may be or may include code to perform tasks involving coordination, scheduling, arbitration, or managing operation of computing device 200, for example, scheduling execution of programs. Memory 220 may be or may include, for example, a Random Access Memory (RAM), a read only memory (ROM), a Flash memory, a volatile or non-volatile memory, or other suitable memory units or storage units. Memory 220 may be or may include a plurality of different memory units. Memory 220 may store for example, instructions (e.g. code 225) to carry out a method as disclosed herein, and/or data such as low-level action data, output data, etc.

Executable code 225 may be any application, e.g. a program, process, task or script. Executable code 225 may be executed by controller 205 possibly under control of operating system 215. For example, executable code 225 may be one or more applications performing methods as disclosed herein. In some embodiments, more than one computing device 200 or components of device 200 may be used. One or more processor(s) 205 may be configured to carry out embodiments of the present invention by for example executing software or code. Storage 230 may be or may include, for example, a hard disk drive, a floppy disk drive, a Compact Disk (CD) drive, a universal serial bus (USB) device or other suitable removable and/or fixed storage unit. Data described herein may be stored in a storage 230 and may be loaded from storage 230 into a memory 220 where it may be processed by controller 205.

Input devices 235 may be or may include a mouse, a keyboard, a touch screen or pad or any suitable input device or combination of devices. Output devices 240 may include one or more displays, speakers and/or any other suitable output devices or combination of output devices. Any applicable input/output (I/O) devices may be connected to computing device 200, for example, a wired or wireless network interface card (NIC), a modem, printer, a universal serial bus (USB) device or external hard drive may be included in input devices 235 and/or output devices 240.

Embodiments of the invention may include one or more article(s) (e.g. memory 220 or storage 230) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Resource Action Inventory (RAI) Interface

In a RAI Interface, a policy author may detail a layout of the application in form of resources, actions, identities and/or other key elements in the product.

For a subject, role or ruleset, one or more resources may be allocated. A resource may be an element which may be used by a subject, role or ruleset in an action, provided that permission for that action has been provided to that subject, role or ruleset. Non-limiting examples for a resource may be a document, a file, an image or a video.

For each resource, one or more actions may be allocated. An action may relate to a specific use of a resource for which permission may be granted, restricted or limited. Non-limiting examples for an action may be: read, execute, view or edit.

An identity may be a user of an application or product for which a policy may be created. An identity may be a subject, e.g. a human, or a role, e.g. a customer or an automated service.

A key element of a product may be an essential object that is used in a product or an application or an essential subject that uses an object in a product or application.

Policy authors may further add attributes to resources or actions, e.g. in form of key-value pair. Attributes can further be used and are further described in the Policy Set Interface, as detailed below.

By introducing resources and actions, a policy author may target an application for which they seek to implement access control policies. In this context, an "application" or a "product" may be a software solution for which an author seeks to implement policies to define access and use of the software solutions for users.

In an example, a policy author may seek to define policies for a task management system, in which a list of tasks would be a resource, a single task would be a resource and the author could allocate actions such as "create", "read", "update", "delete", "mark-as-complete" to one or more resources. Further, an author may allow a user to add resources and/or actions within limits of a policy defining access control for a user.

Figure 3:
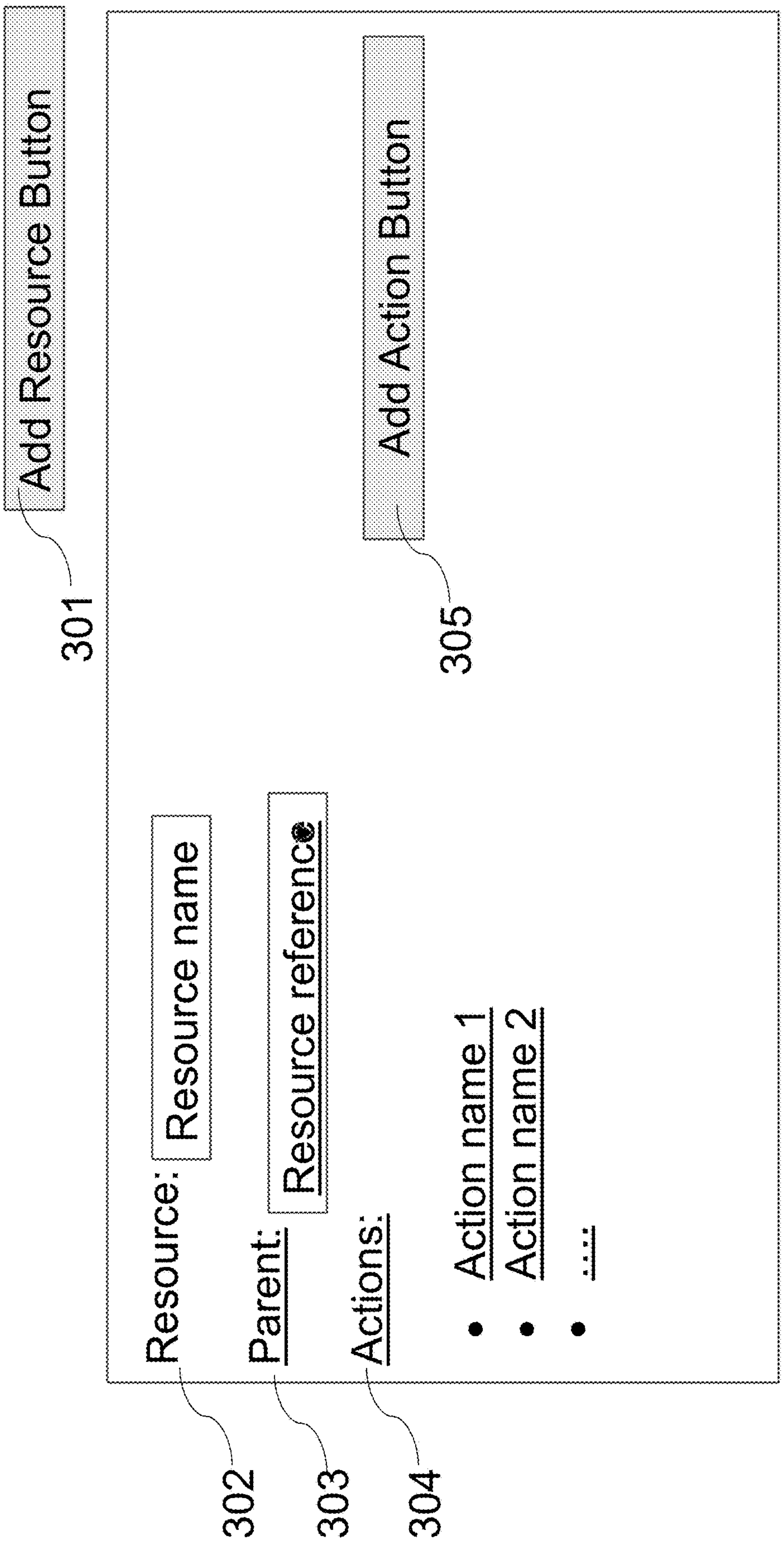
FIG. 3 is an illustration of a Resource Action Inventory Interface, according to an embodiment of the present invention.

FIG. 3 schematically illustrates a RAI interface. The RAI interface may enable an author to add a resource via the "Add Resource Button" 301 to an RAI. A resource may further be given a name. In addition, a resource may be linked to a parent resource via the provision of a resource reference.

For example, a resource may be a document relating to a specific experiment in a laboratory journal. To link the document to the laboratory journal, a resource reference to the parent document or folder comprising the laboratory journal may be provided.

Data-Source Integration Interface

A Data-Source Integration Interface may enable an author to integrate/access data sources using a policy software. A policy software of the system disclosed herein retrieve data from data sources, e.g. databases. Data from data sources may include attributes, e.g. values of a database. For example, data from a database related to a billing system may be integrated into the system disclosed herein. Attributes within a billing system database may be customer, price, sold items. The integration of data sources into the system disclosed herein may be dynamically configurable.

Attributes disclosed in the data source integration may be used to create rules in the Policy-Set Interface. An author may link or compare values of attributes with other values of attributes within a Policy-Set Interface to generate rules. One or more rules may further be combined to create policy-Sets.

Figure 4:
FIG. 4 is an illustration of a Data Source Interface, according to an embodiment of the present invention.

In FIG. 4, a schematic illustration of a Data Sources Interface is described. The Data Sources Interface includes an "Add Data Source Button" 401. Using the "Add Data Source Button" 401, an author may select a Data Source via selection of a Data source name 402 that can be implemented into the system. Data from a data source may be stored within the system in storage that is accessed by a computer, as disclosed in FIG. 2.

A data source may have a specific type 403, for example, a data source may be an identity data source, an input data source, or an external data source. An identity data source may be a data source that includes attributes about one or more subjects. An input data source may be, for example, a database stored in the storage of the computer of the system. An external data source may be a data source that can be accessed via Internet, or wherein data is located on a data storage device such as a Universal Serial Bus (USB) flash drive, which can be connected to the computer of the system, as detailed in FIG. 2.

Referring to FIG. 4, an author may add one or more attributes 404 using the "Add Attributes Button" 405 to data provided by a data source that may define attributes 404 by their attribute name and attribute type, e.g. an integer, a string, a date, a time, a Boolean and/or a complex object (such as JSON).

Policy-Sets Interface

In a Policy-Sets Interface, an author may access policy set cards and may dynamically configure policy-sets for resources, actions, identities and/or other key elements in the product that an author has previously introduced into the system by interaction with a RAI interface or a Data-Source Integration Interface. A policy set card may be a visual interpretation of a permissions matrix for a user. A user may be a subject, e.g. a person that may be identified by a name, a role for example an administrator, customer, client or an employee, or a policy set. A policy set card lists resources for a user in relation to actions that may be performed on or with resources. A user may receive access to carry out an action on a resource or using a resource based on a permission. Vice versa, a permission may provide access or deny access for a user to perform an action on a resource.

Figure 5:
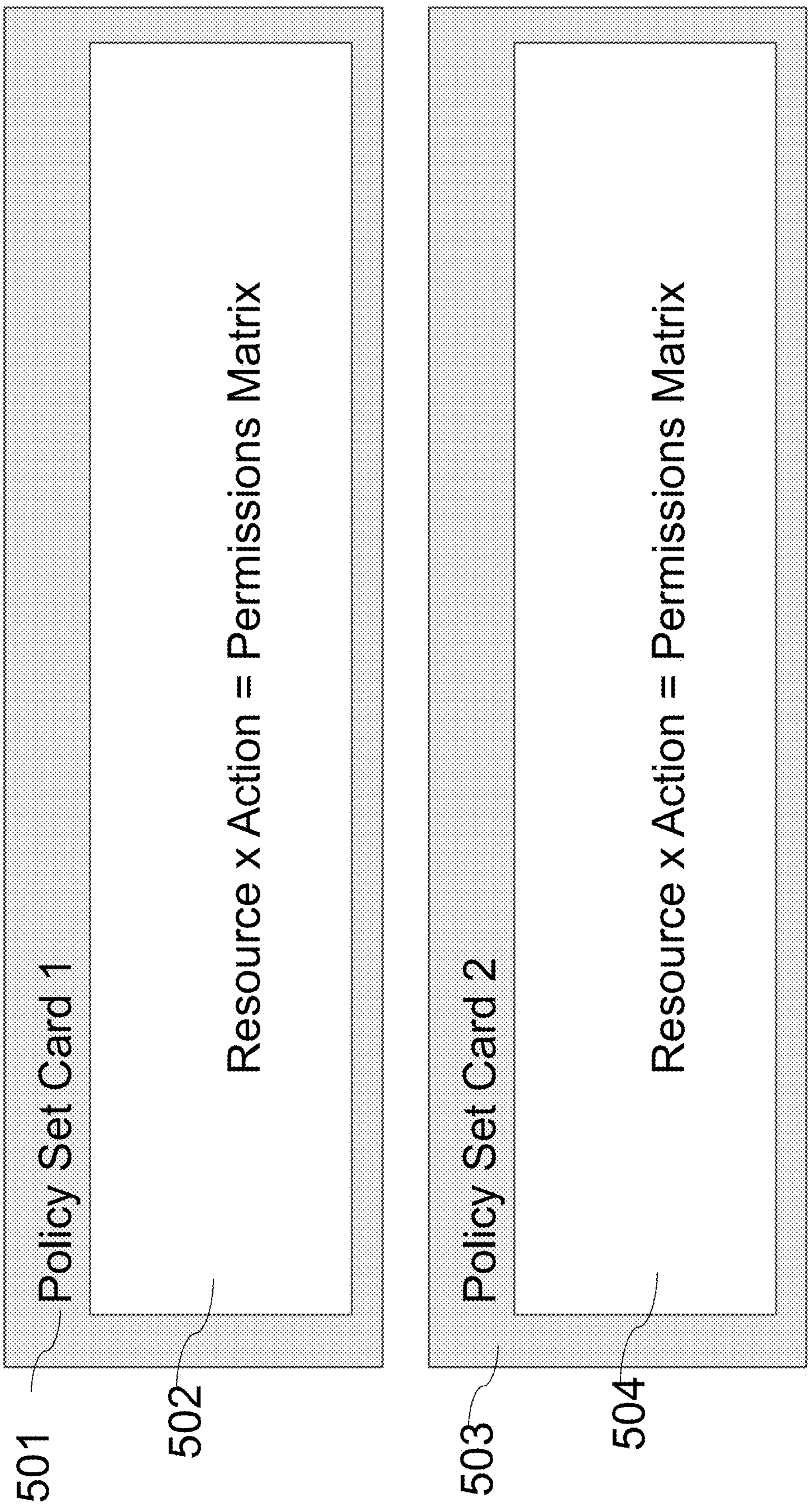
FIG. 5 is an illustration of an implementation of a policy set card permissions matrix, according to an embodiment of the present invention.

FIG. 5 schematically illustrates policy set card 1 501 and policy set card 2 503. Each of the policy set cards 501 and 503 includes a permissions matrix 502 and 504. Within a permissions matrix, resources may be allocated to specific actions.

Figure 6:
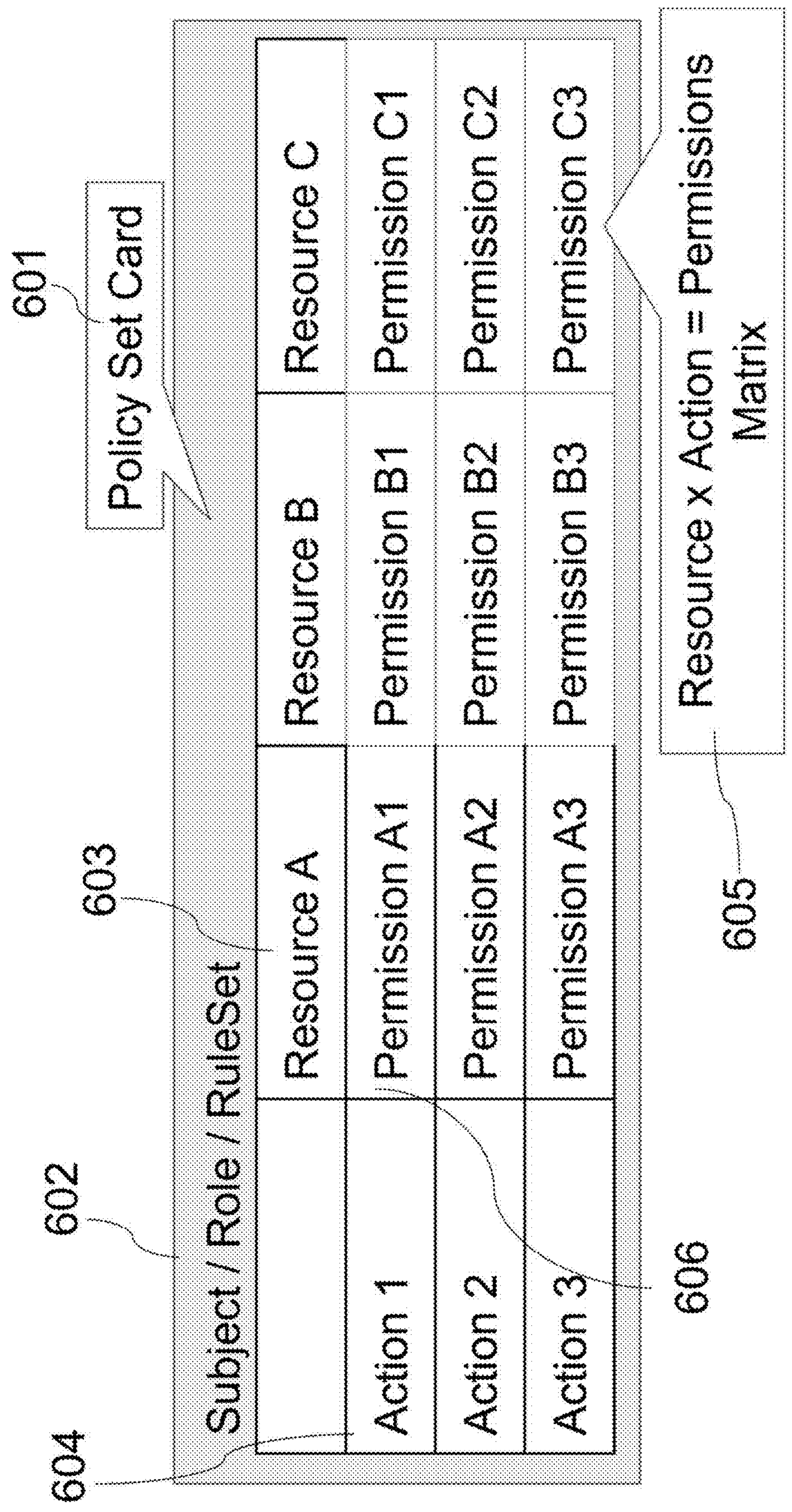
FIG. 6 is an illustration of a policy set card permissions matrix, according to an embodiment of the present invention.

In FIG. 6, an example of a policy set card 601 is schematically illustrated. A policy set card may be created for a subject, for a role or for a policy set.

A policy set card may be created for a subject, for example a person with a specific name. A policy set card may be created for a certain role, for example an administrator, a customer or an employee.

A policy set card may be created for a number of subjects that fulfil a condition of a rule, which is set by a policy set: For example, a first rule relating to a location of a subject and may define subjects that have their residency in Europe. A second rule relating to the age of a subject and may define subjects that are at least 30 years old. A policy set may combine both rules to a set relating to subjects that have a residency in Europe and are at least 30 years old. The resulting policy set card may, thus, apply to subjects that have a residency in Europe and are at least 30 years old.

Referring to FIG. 6, policy set card 601 includes a permissions matrix 605. A permissions matrix of a policy set card may be created by allocating one or more actions 604 to one or more resources 603 that have been previously introduced using an RAI Interface. In the detailed example, the permissions matrix is created for three resources, "Resource A", "Resource B" and "Resource C", and three actions "Action A", "Action B" and "Action C".

Permission matrix 605 may further include permissions 606 for each of the resources in combination with each of the actions.

Permission 606 may describe how a subject/role/ruleset can interact (by action 604) with resource 603. For example, permissions A1 may define Action 1 for "Resource A" for a certain subject/role/ruleset 602.

Figure 7:
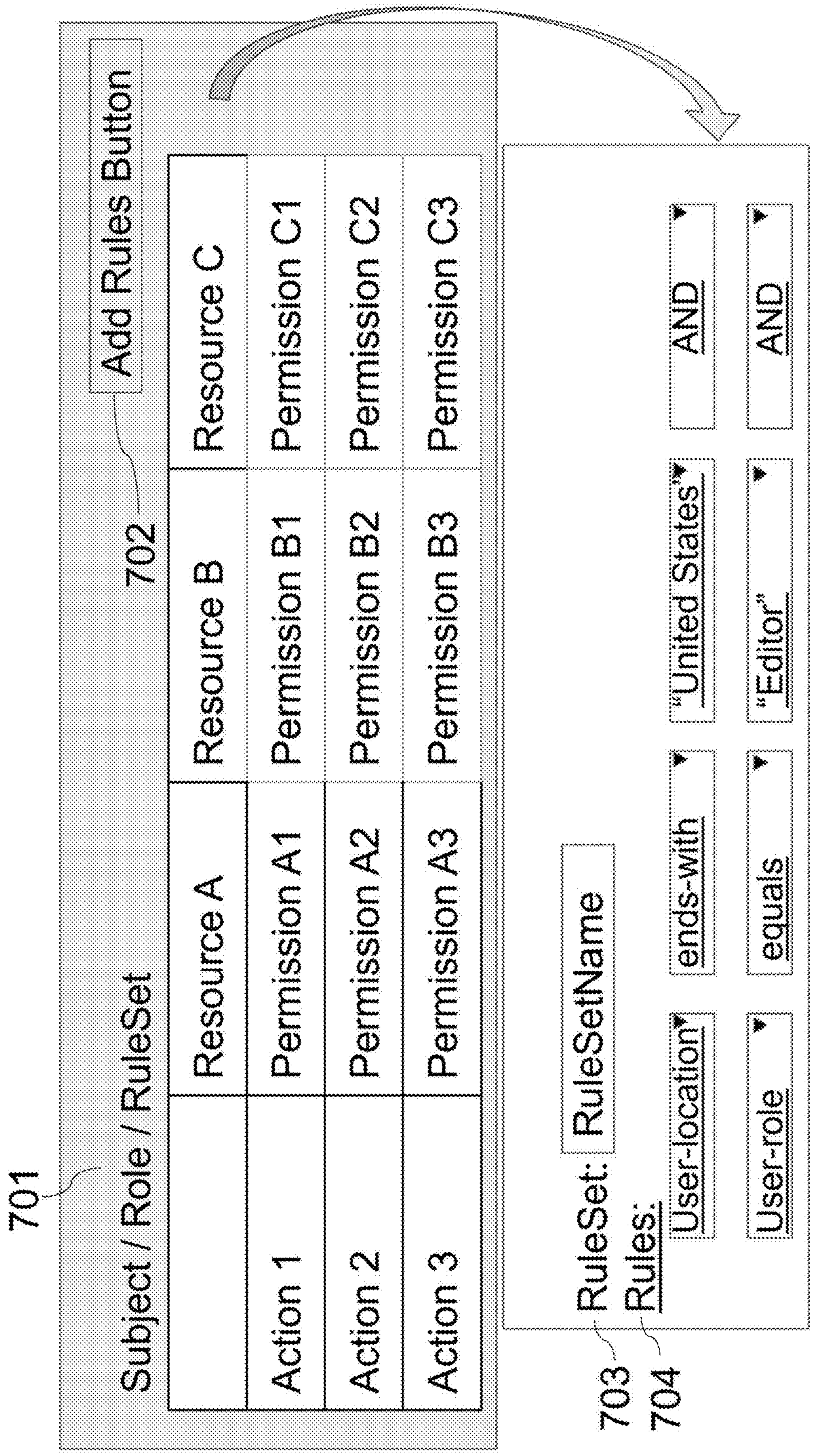
FIG. 7 is an illustration of a policy-set card including rules, according to an embodiment of the present invention

For each policy set card, one or more rules may be created. As detailed in FIG. 7, for a policy set card for a subject/role/ruleset 701 rules may be created using an "Add Rules Button" 702. A ruleset 703 may thereby be created by defining a name for a rule in the text field "Rule Set Name". For example, a ruleset may comprise two rules 704: a first rule may define an attribute "user-location" by an attribute "United States" and a second rule may define a role "User role" by a specific role "Editor". The terms "user role" and "Editor" may thereby be attributes.

Figure 8:
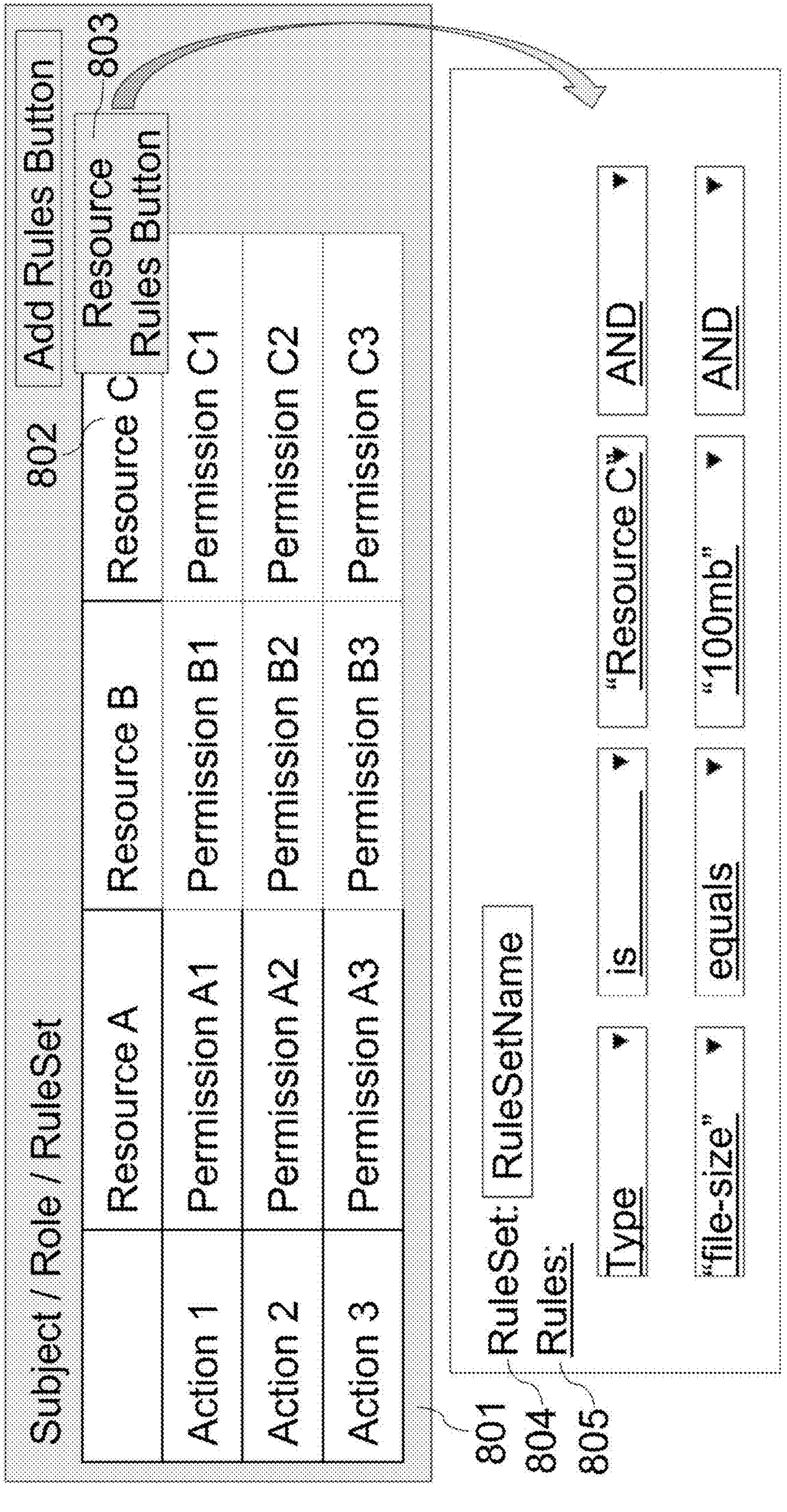
FIG. 8 is an illustration of a policy-set card including resources comprising rules, according to an embodiment of the present invention.

Within a policy set card, a resource may also be defined by a ruleset. In FIG. 8, an example for policy set card 801 is detailed in which "Resource C" 802 may be defined by a ruleset for a resource. Using the "Resource Rule Button" 803 on policy set card 801, a ruleset 804 may be defined that comprises one or more rules 805 characterising a resource, e.g. Resource C 802. In the present example, a resource may be defined by the attribute "type" and may be linked via operator "is" to "Resource C". RuleSet 804 may further comprise a second rule including a condition that the attribute "file-size" may be limited by operator "equals" to a file size of "100 mb". Hence, policy set card 801 may define actions for Resource C with a file size equal to 100 mb.

Figure 9:
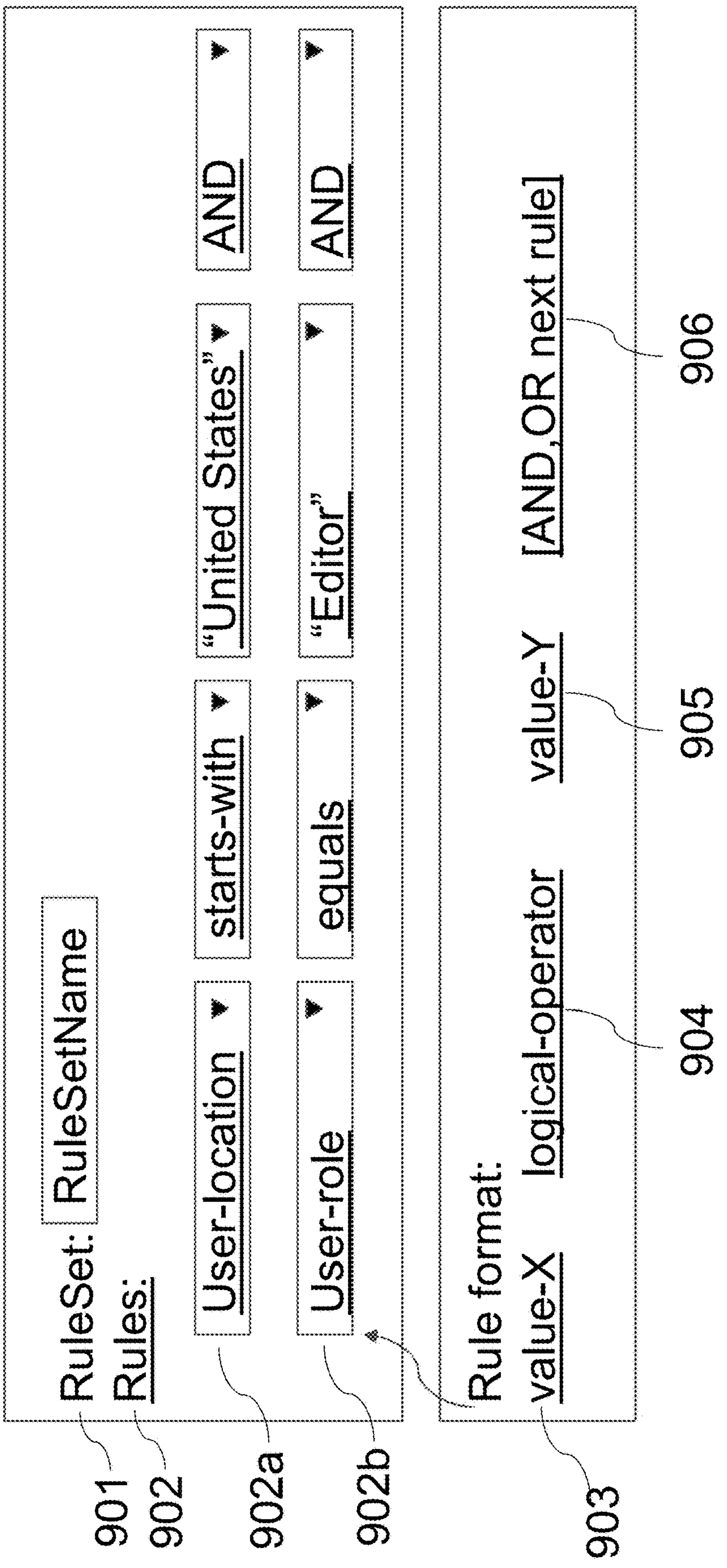
FIG. 9 is an illustration of a Policy-Set Interface for identities, according to an embodiment of the present invention.

A schematic illustration of a creation of a policy set 901 for an identity comprising rule 902 using a Policy-Set Interface is disclosed in FIG. 9. Generally, a rule 902 may be created by comparing a value-X 903 of an attribute using a logical-operator 904 with a value-Y 905 of an attribute. Optionally, a rule may be linked to a subsequent rule by an "AND" or "OR" operator 906 to create a ruleset. For example, using an "AND" operator, rule **902*a* and rule 902*b* may be required to be fulfilled to fulfil a policy set of both rules. Using an "OR" operator, rule 902*a* or rule 902*b*** may be fulfilled to fulfil a policy set of both rules.

A value of an attribute may be a parent attribute including a class of attributes. For example, a parent attribute may have the value "User-location" and thus defines a generic value of an attribute class related to the location of a user. A value "United States" may be an attribute that is included in the "User-location" class and, therefore, is a specific attribute within the parent attribute "User-location".

As mentioned earlier, attributes for the implementation of rules may be provided to the system via data sources. The provision of data may be accomplished by a data port. A data port may enable the input of external data such as a database. For example, a database of a billing system comprising attributes relating to attribute classes article price, quantity or currency, may be accessed by a Data-Source Integration Interface.

In addition, in the implementation of a rule, logical operators 904 may be implemented that allow to compare a value-X of an attribute 903 with a specific value-Y for attribute 905. A logical operator may be selected from a pre-generated list of logical operators or may be defined by an author.

Figure 10:
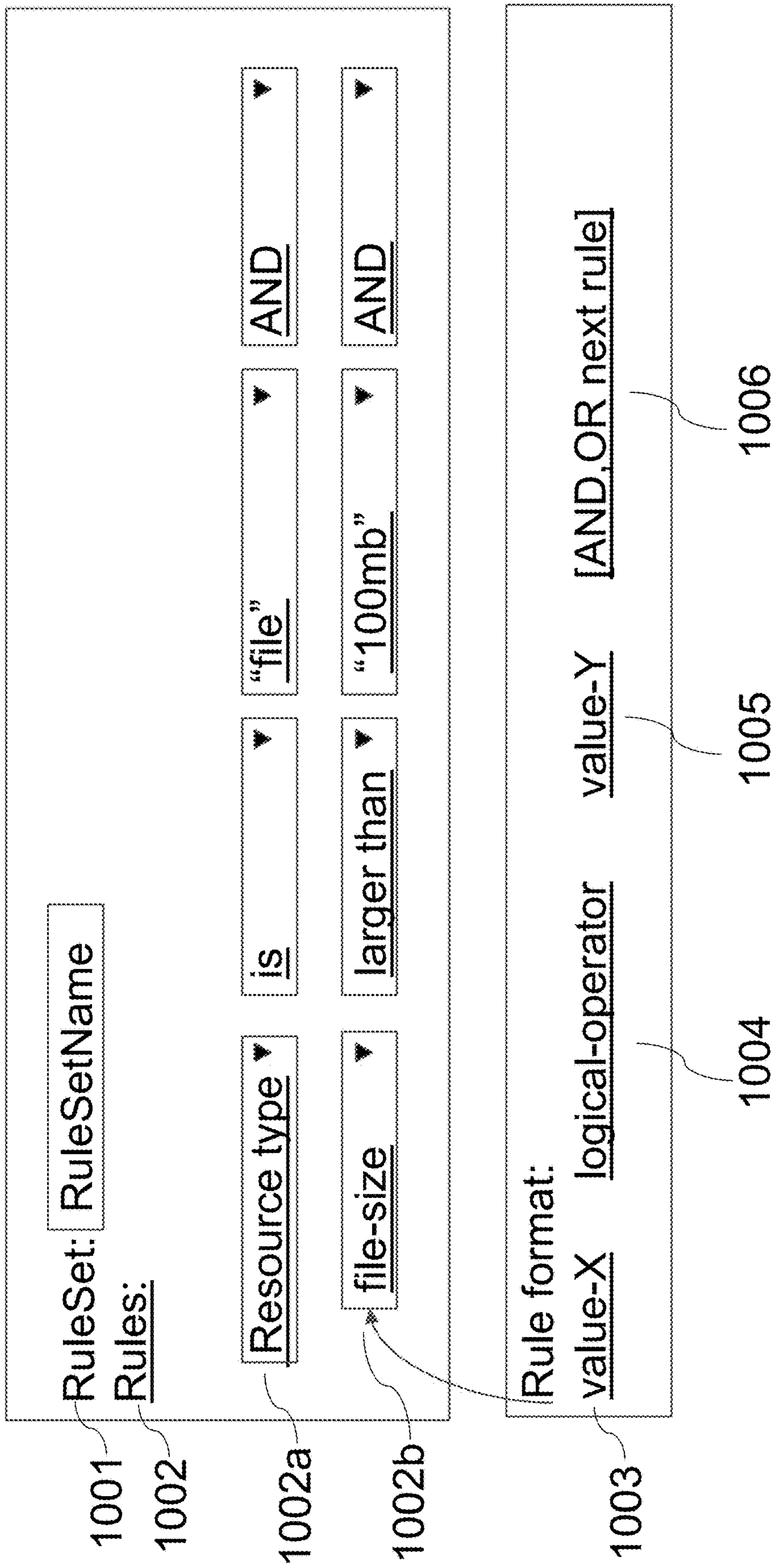
FIG. 10 is an illustration of a Policy-Set Interface for resources, according to an embodiment of the present invention.

In FIG. 10, a schematic illustration of a Policy-Set Interface for a resource is disclosed. Analog to a Policy-Set Interface for an identity, a policy set 1001 for a resource may comprise one or more rules 1002.

Rules for resources may be defined by comparing a value-X 1003 of an attribute using a logical-operator 1004 with a value-Y 1005 of an attribute. Optionally, a rule may be linked to a subsequent rule by an "AND" or "OR" operator 1006 to create a ruleset.

A rule **1002*a* may be created by defining a type of resource by creating a rule related to the attribute "Resource type" and linking it by the logical operator "is" to a type of resource such as described by the attribute "file". Rule 1002*a* may be linked to rule 1002*b* by operator "AND". In addition to a resource type being a file, rule 1002*b* further sets a condition that a file-size larger than 100 mb is required. In combination by operator "AND", ruleset 1001 comprises rules 1002*a* and 1002*b*** and relates to file resources and to resources that have a file size larger than 100 mb.

Figure 11:
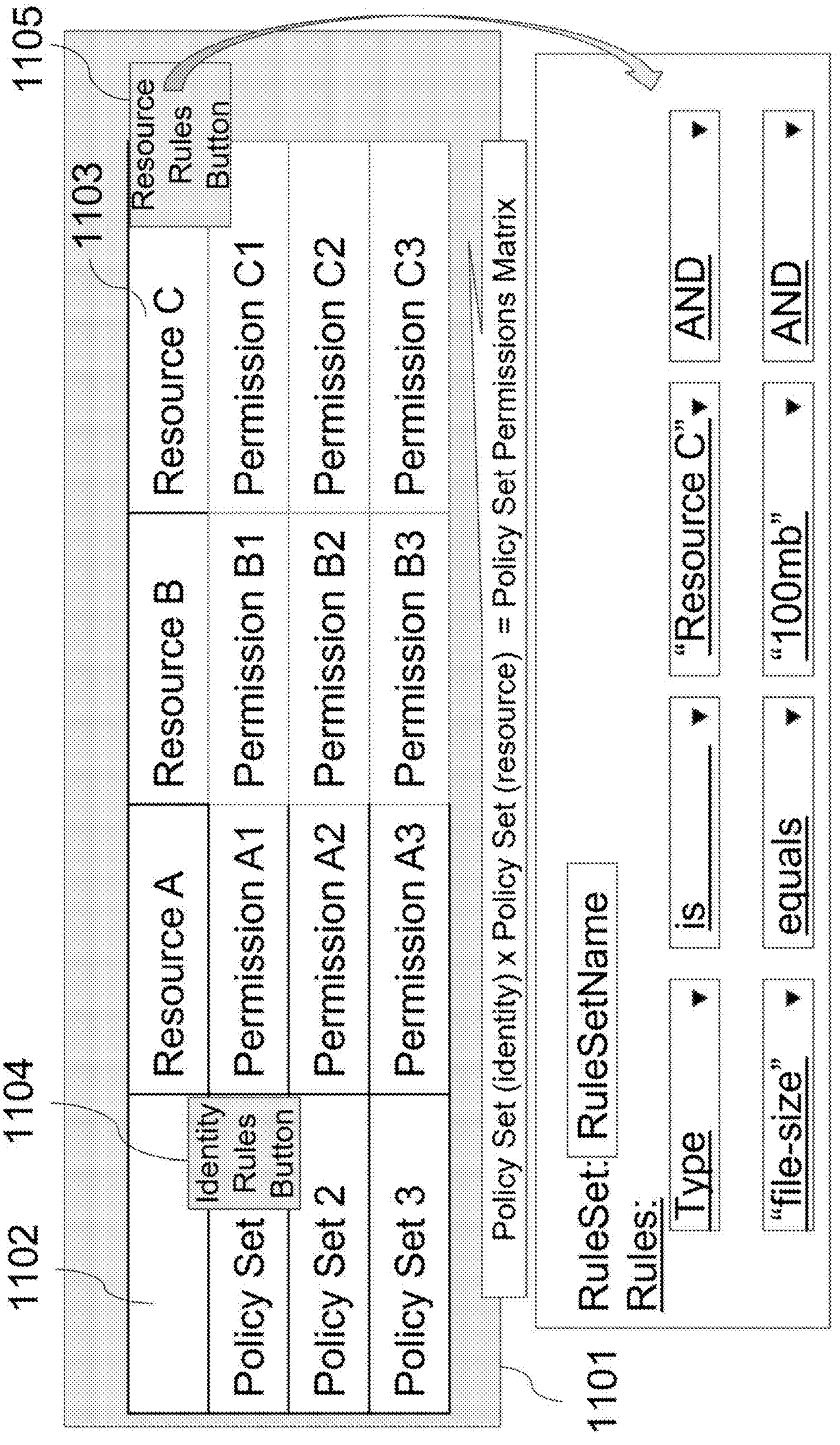
FIG. 11 is an illustration of a policy-set permission matrix, according to an embodiment of the present invention.

FIG. 11 shows a schematic example for a policy-set permissions matrix card 1101. Policy set permissions matrix card 1101 is a matrix created from policy sets generated for identities 1102 and from policy sets generated for resources 1103. Identity policy sets 1102 may be created using an Identity Rules Button 1104, leading to a Policy-Set Interface for identities as shown in FIG. 9 and may allow the introduction of rules related to a specific identity, e.g. an editor. identity policy sets 1103 may be created using a Resource Rules Button 1105, leading to a Policy-Set Interface for resources as shown in FIG. 10 and may allow the introduction of rules related to a specific resource, e.g. a file.

Permissions Interface

For each of the created policy-sets, including a permissions matrix created from resources and their actions, an author can dynamically assign permissions. policy-sets prepared in the Policy-Set Interface can be used and allocated in the Permissions Interface to one or more actions allocated to one or more resources to generate permission assignments for each action related to a resource.

A permission assignment based on data input using interfaces of the system disclosed herein for one or more subjects/roles/rulesets may then be compiled as a policy code or as a policy graph schema.

Data sources that may provide one or more of resources, actions and attributes, e.g. values of attributes, are evaluated in real-time during the generation of permission assignments.

Policy Graph Representation of Policy Sets

Figure 12:
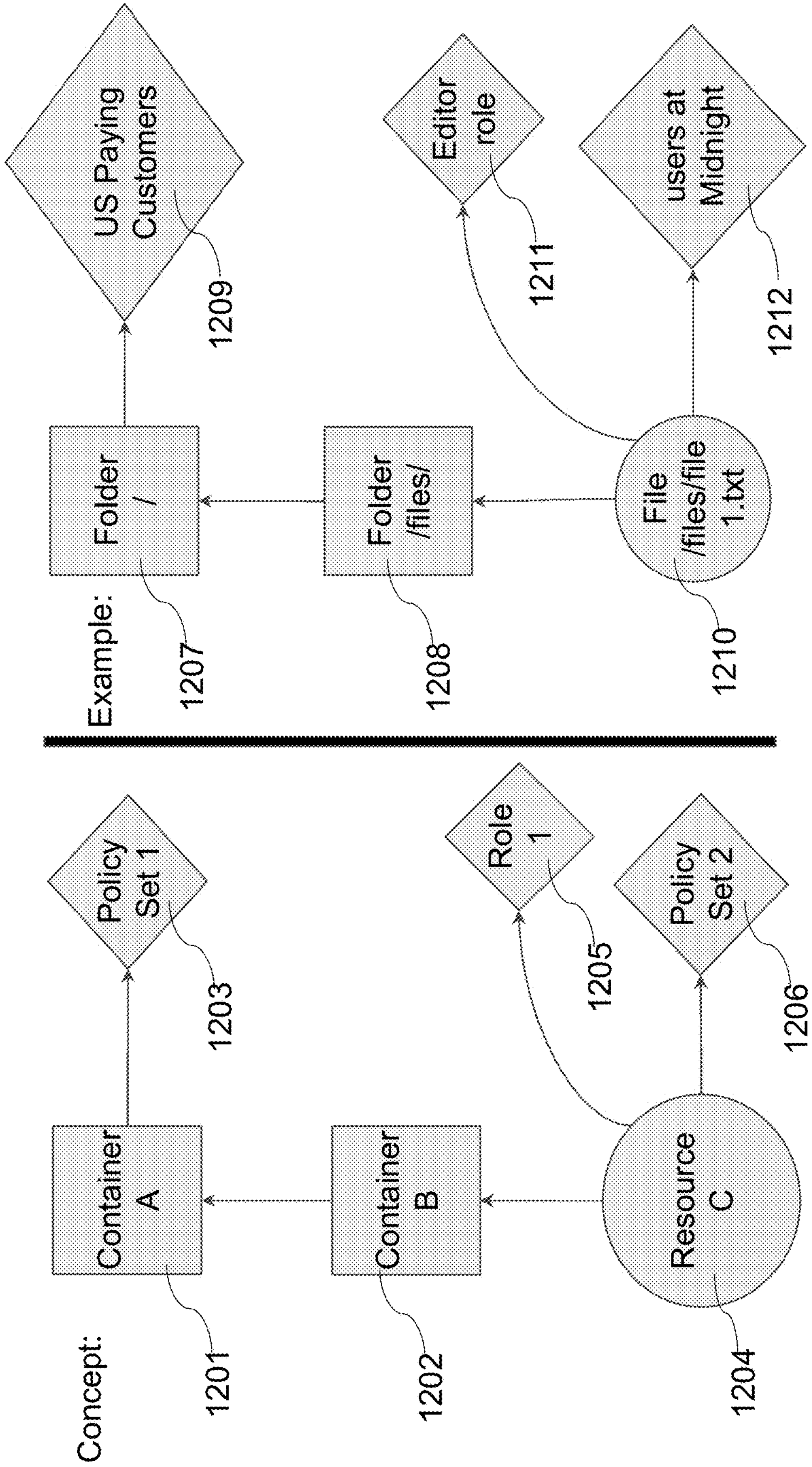
FIG. 12 is an illustration of a policy graph representation of policy sets, according to an embodiment of the present invention.

In FIG. 12, conceptual and exemplified policy graph representations of policy sets are disclosed. In a policy graph representation exemplified in FIG. 12, policy sets previously represented as cards in the Policy Sets Interfaces (FIGS. 9 and 10) may be represented as policy set nodes within a policy graph.

Representation of a dynamic authorization implementation may further enable an author to use a policy graph to deduct further information on permissions of a dynamic authorization implementation. For example, an author can query a policy graph to receive details on users having permission to access a resource.

Thus, representation of a dynamic authorization implementation as a policy graph may enable an author to index and reverse-index information on permissions from the policy graph using a graph-based software.

The term "to index information" may refer to an author using a graph-based software to query a policy data graph for details of certain permissions for a user of an application, e.g. details on resources a user of an application is able to access.

In addition, a data graph can be queried by a graph-based software "to reverse-index information" from a policy graph. In this context, the term "to reverse-index information" from a policy graph may relate to query a policy data graph for details of certain users who have permission to access an application, e.g. details of users that are able to access a resource of an application.

The possibility to index and reverse-index a policy graph using a graph-based software may further allow to audit or to evaluate a dynamic authorization implementation for an application. The ability to audit a dynamic authorization implementation for an application may allow an author to evaluate introduced policies for an application. For example, an author may identify gaps in the implementation of a policy set that may allow a particular resource to be accessed by users who are believed to have limited access to a particular resource.

Access queries for resources can be resolved by navigating between nodes within a policy graph. Upon arriving at a policy-set node, the title of the policy set may be interpreted as an answer to the access query, e.g. a set of conditions checking for location in the USA can be labeled "US users". Although the interpretation of a policy graph representation may require additional evaluation to a list of attributes, resources, actions or users, the interpretation of policy graph representation may be valuable for an author testing or auditing the policy.

In a concept referred to in FIG. 12, Container A 1201 and Container B 1202 are resources that are connected with each other. Container A 1201 may be a Folder 1207 that contains a subfolder 908 related to Container B 1202 in the conceptual representation.

Container A is further linked to policy set 1 1203. In an example, policy set 1 1203 may limit the access to a Folder 1207 represented by Container A 1201 to US paying customers. The policy may define a permission for the action "access" and the resource "Folder". The policy may further be defined in the Policy-Set Interface by setting a value for customer location as "US", defining the logical operator as "equal" and defining the value for the second attribute as "paid".

Container B 1202 may be connected to Resource C 1204. In relation to the example, Resource C 1204 may be a document such as file1.txt 1210. Permission to Resource C 1204 may have further been assigned based on Role 1 and PolicySet 2 1206. For example, the assignment of a specific role for permission of document file1.txt 1210 (equivalent to Resource C 1204) may enable to assign Editors 1211 to have access to document file1.txt 1210 (equivalent to Resource C 1204). In addition, permission to Resource C 1204 has been assigned based on PolicySet 2 1206, defined as "users at Midnight" 1212 in the example.

Thus, in relation to the example provided in FIG. 12, access to document file1.txt 1210 may be provided for either US paying customers 1209 (PolicySet1), users that have the editor role 1211 (Role 1) or any user if the time is midnight 1212 (PolicySet2).

Interface to Version Control and Deployment

Figure 13:
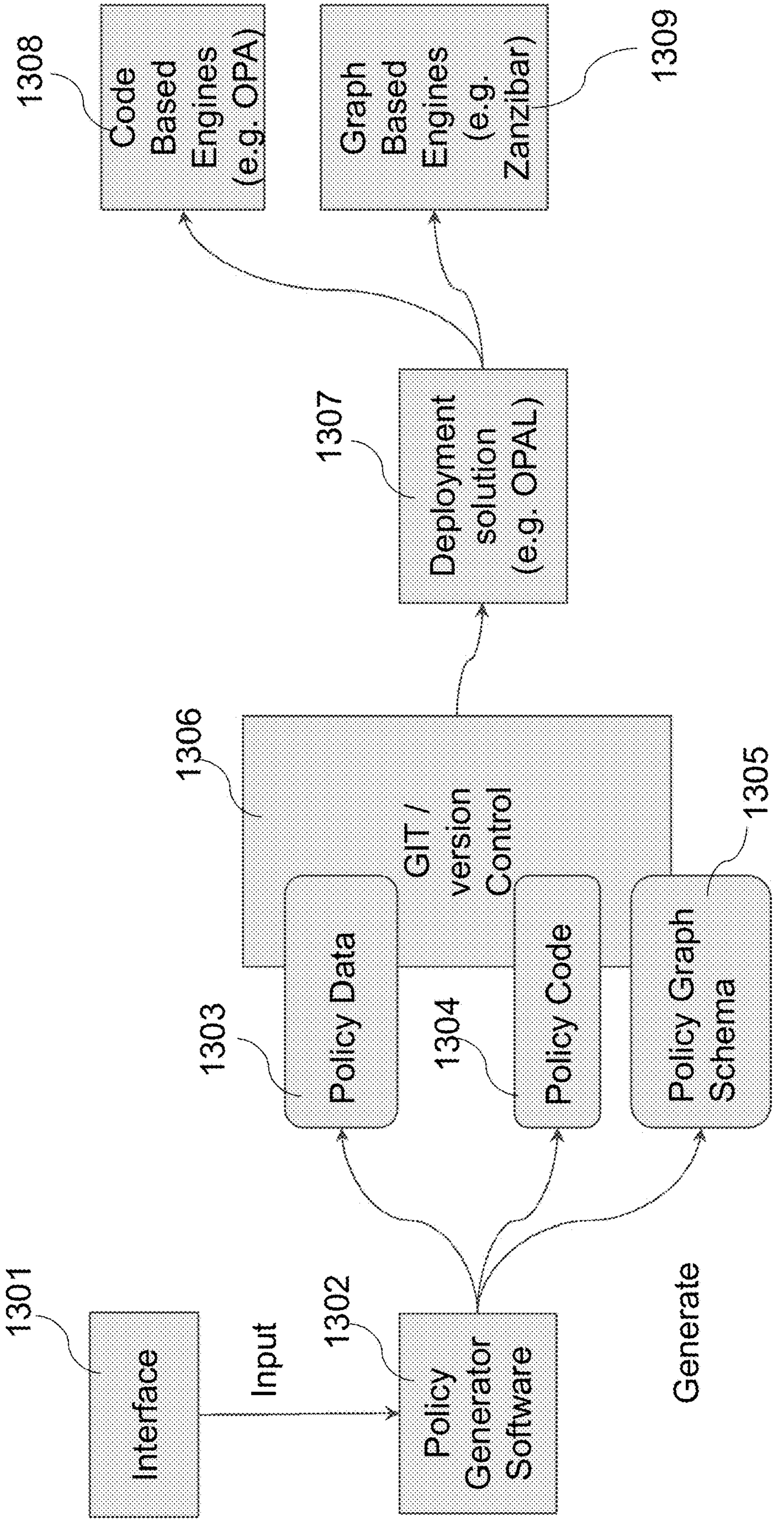
FIG. 13 is an illustration of an interface to version control and deployment, according to an embodiment of the present invention.

In FIG. 13, a schematic illustration of an interface to version control and deployment of the present invention is detailed.

Interface 1301 comprises the arrangement of Resource Action Inventory Interface, Data-Source Integration Interface, Policy-Sets Interface and Permissions Interface. All interfaces may be connected by system software 103 by processor 102 as defined in FIG. 1. In addition, the interfaces may be configured to receive and provide data from an author 108.

A Resource Action Inventory Interface may be configured to receive one or more layout elements for an application from an author. A Data-Source Integration Interface may be configured to receive one or more data sources from an author. A Policy-Sets Interface may be configured to receive one or more rules from an author. A Permissions Interface may be configured to receive an assignment of dynamically configurable permissions from an author.

The input by an author via any of the four interfaces detailed herein may be processed by a software of the system, e.g. software 1302. In-put by an author using the interface described herein may be stored on a storage device 230 (FIG. 2). A storage device 230 (FIG. 2) may be configured to store software 1302 and code compiled by software 1302.

software 1302 may be configured to generate policy data 1303. Software 1302 may be further configured to generate policy code 1304. Software 1302 may be furthermore configured to generate policy graph schema 1305.

A software, e.g. software 1302, may compile input of data, e.g. resources, actions, rulesets, attributes, by an author using one or more interfaces into a programming language, e.g. JavaScript Object Notation (JSON). A software, e.g. software 1302, may further use submodules to translate data input by a user into a policy code and/or policy graph. A submodule may be an independent software that may receive intermediate data, e.g. input of data by an author using interfaces disclosed herein, and generates a policy code, policy graph schema or other data structures.

Generated policy data 1303, policy code 1304 and policy graph schema 1305 may be stored in storage of a computer (see computer 101 of FIG. 1) or in a repository 1306, for example the repository may be an open-source software repository such as a "Git repository".

A generated policy code 1304 may further be deployed by a computer software 1307. In example, deployment solutions 1307 may be open-source real-time physics software application programming interfaces such as Open Policy Administration Layer (OPAL).

Further deployment solutions for generated policy code 1304 may be code-based software 1308, such as open-source policy software, for example Open Policy Agent (OPA) or eXtensible Access Control Markup Language (XACML).

For generated policy graph schema 1305, graph-based software 1309 may be used as a deployment solution. An example for graph-based software 1309 is Google Zanzibar.

Generated graph schema 1305 may further be queried by graph-based software 1309 and may be implemented in reverse-indexing procedures without reconfiguration of the graph schema 1305. For example, in reverse-indexing procedures graph-based software 1309 may query graph schema 1305 to receive information on "who has access to document Y" opposed to "does X have access to document Y".

A policy author may also dynamically update and apply changes to permission assignments for one or more subjects/roles/ruleset using the interfaces disclosed herein and may compile a new policy code for an updated permission assignment. For each compilation of a new policy code for an application a new version of a permission assignment may be created. Thus, an author may have version control on different permission assignments for an application.

Figure 14:
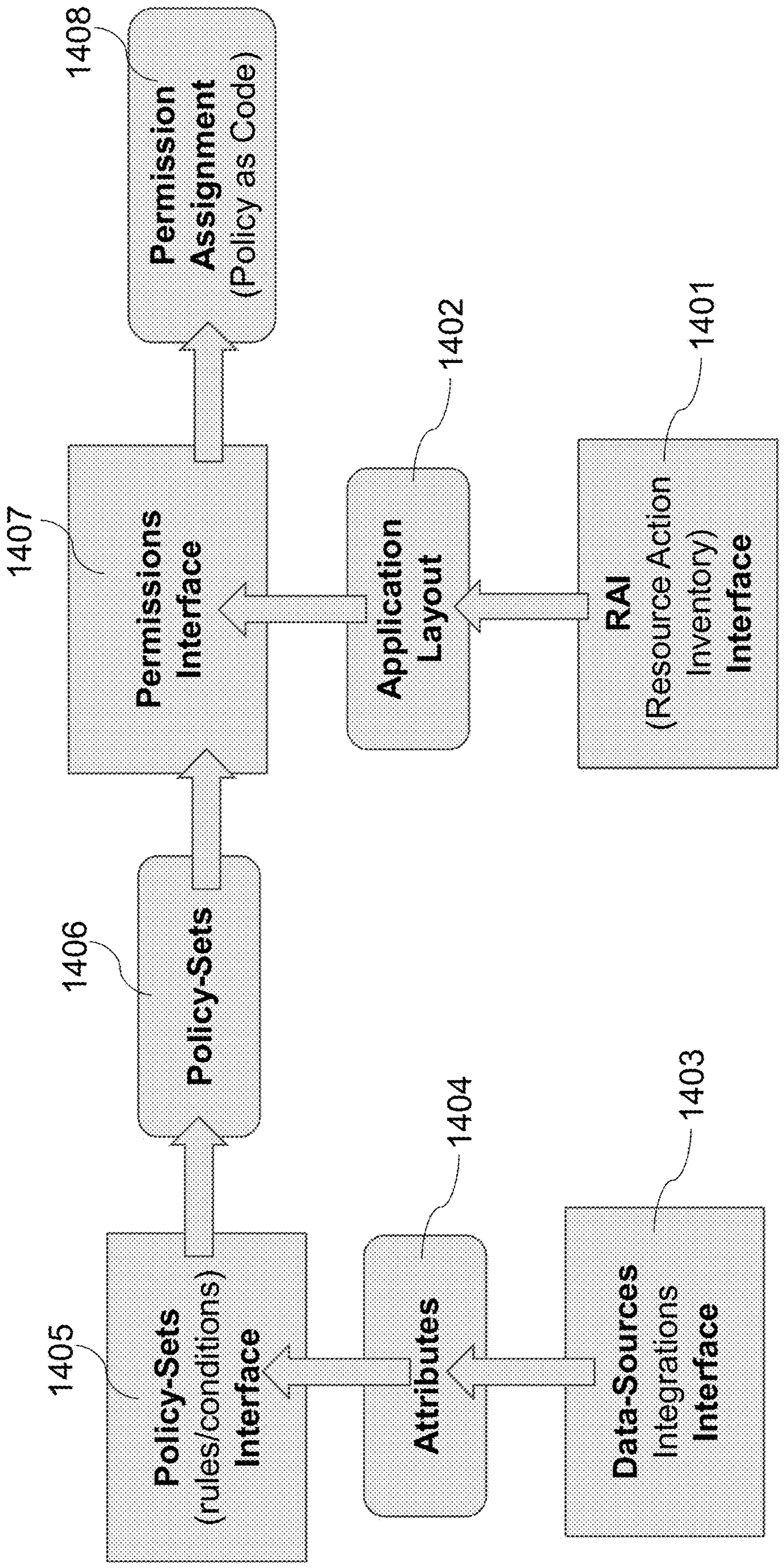
FIG. 14 is an illustration of policy authoring interfaces interoperability, according to an embodiment of the present invention.

In FIG. 14, the Policy Authoring Interface's interoperability is detailed. In general, an author may have access to a Resource Action Inventory Interface 1401, a Data-Source Integration Interface 1403, a Policy-Sets Interface 1405 and a Permissions Interface 1407. All interfaces may be part of a system including a software executed by a processor. An author may interact with interfaces of a software of the system in any particular order.

Referring to FIG. 14, there is provided, in accordance with some embodiments of the invention, a system for a dynamic configuration of a policy model for an application as source code, the system comprising: a computer processor; a Resource Action Inventory Interface 1401, configured to receive one or more layout elements for an application from a user to provide layout 1402 of an application; a Data-Source Integration Interface 1403, configured to receive one or more data sources from the user; a Policy-Sets Interface 1405, configured receive one or more rules from the user; and a Permissions Interface 1407, configured to receive an assignment of dynamically configurable permissions from the user, wherein at least one of: the Resource Action Inventory Interface 1401, the Data-Source Integration Interface 1403, the Policy-Sets Interface 1405, and the Permissions Interface 1407, generate a set of instructions for the provision of policy code.

When executed, a computer processor may receive one or more layout elements for an application from the user at the Resource Action Inventory Interface 1401. The computer processor may map a layout of the application 1402 from the one or more layout elements received at the Resource Action Inventory Interface.

Further, a computer processor may enable receiving one or more data sources from a user at a Data-Source Integration Interface 1403, may identify one or more attributes 1404 in data present in the one or more data sources and may generate a Policy-Sets Interface 1405 based on the identified one or more attributes.

Furthermore, a computer processor, e.g. processor 102 of computer 101 (FIG. 1), may receive one or more rules from an author at the Policy-Sets Interface 1405. An author, e.g. author 108 (FIG. 1), may create one or more policy sets from the one or more rules received at the Policy-Set Interface 1407.

Moreover, the computer processor may receive an assignment of dynamically configurable permissions from an author for the one or more policy sets at the Permissions Interface 1407, evaluate the one or more policy sets using the dynamically configurable permissions to identify one or more dynamically permitted policy sets, may apply the one or more dynamically permitted policy sets to the layout of the application at the Permissions Interface 1407 and may generate a permission assignment as a policy code 1408 or as a policy graph schema.

Figure 15:
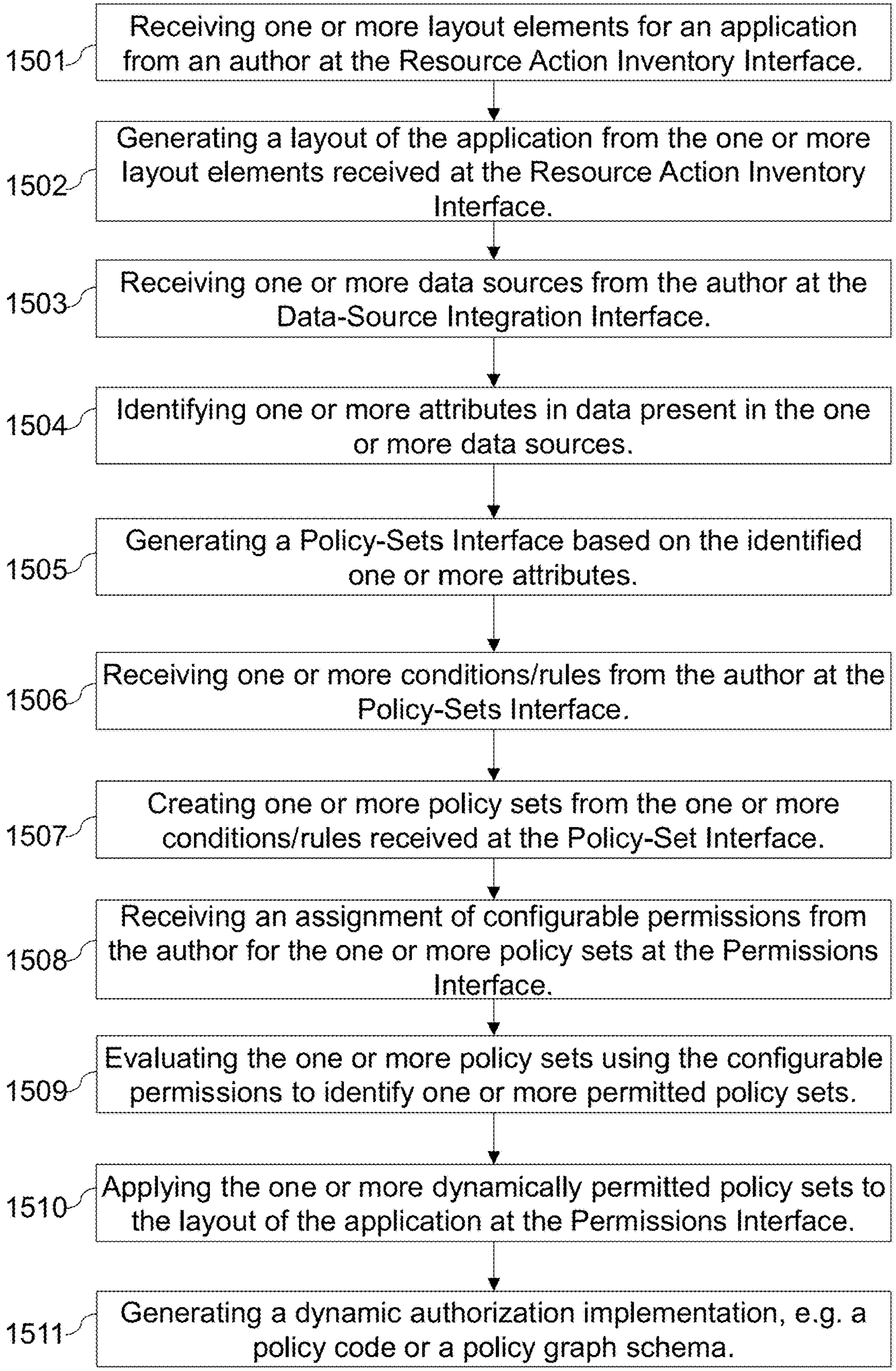
FIG. 15 is a flow chart of a method for dynamically configurating of a policy as a dynamic authorization implementation, according to an embodiment of the present invention.

Referring to FIG. 15, there is provided, in accordance with some embodiments of the invention, a method for dynamically configuring of a policy as a dynamic authorization implementation, e.g. as policy code or policy graph schema, the method comprising: receiving one or more layout elements for an application from an author at the Resource Action Inventory Interface 1501; generating a layout of the application from the one or more layout elements received at the Resource Action Inventory Interface 1502; receiving one or more data sources from the author at the Data-Source Integration Interface 1503; identifying one or more attributes in data present in the one or more data sources 1504; generating a Policy-Sets Interface based on the identified one or more attributes 1505; receiving one or more rules from the author at the Policy-Sets Interface 1506; creating one or more policy sets from the one or more rules received at the Policy-Set Interface 1507; receiving an assignment of dynamically configurable permissions from the author for the one or more policy sets at the Permissions Interface 1508; evaluating the one or more policy sets using the dynamically configurable permissions to identify one or more dynamically permitted policy sets 1509; applying the one or more dynamically permitted policy sets to the layout of the application at the Permissions Interface 1510; and generating a dynamic authorization implementation, e.g. as a policy code or as a policy graph schema 1511.

Transition from a RBAC Policy Model to an ABAC Policy Model

In addition to the provision of policy code or policy graph schema, e.g. for Attribute Based Access Control (ABAC) policies, the system disclosed herein may provide an Interface for the transition of policies prepared in form of a Role Based Access Control (RBAC) policy model to an Attribute Based Access Control (ABAC) policy model.

Figure 16:
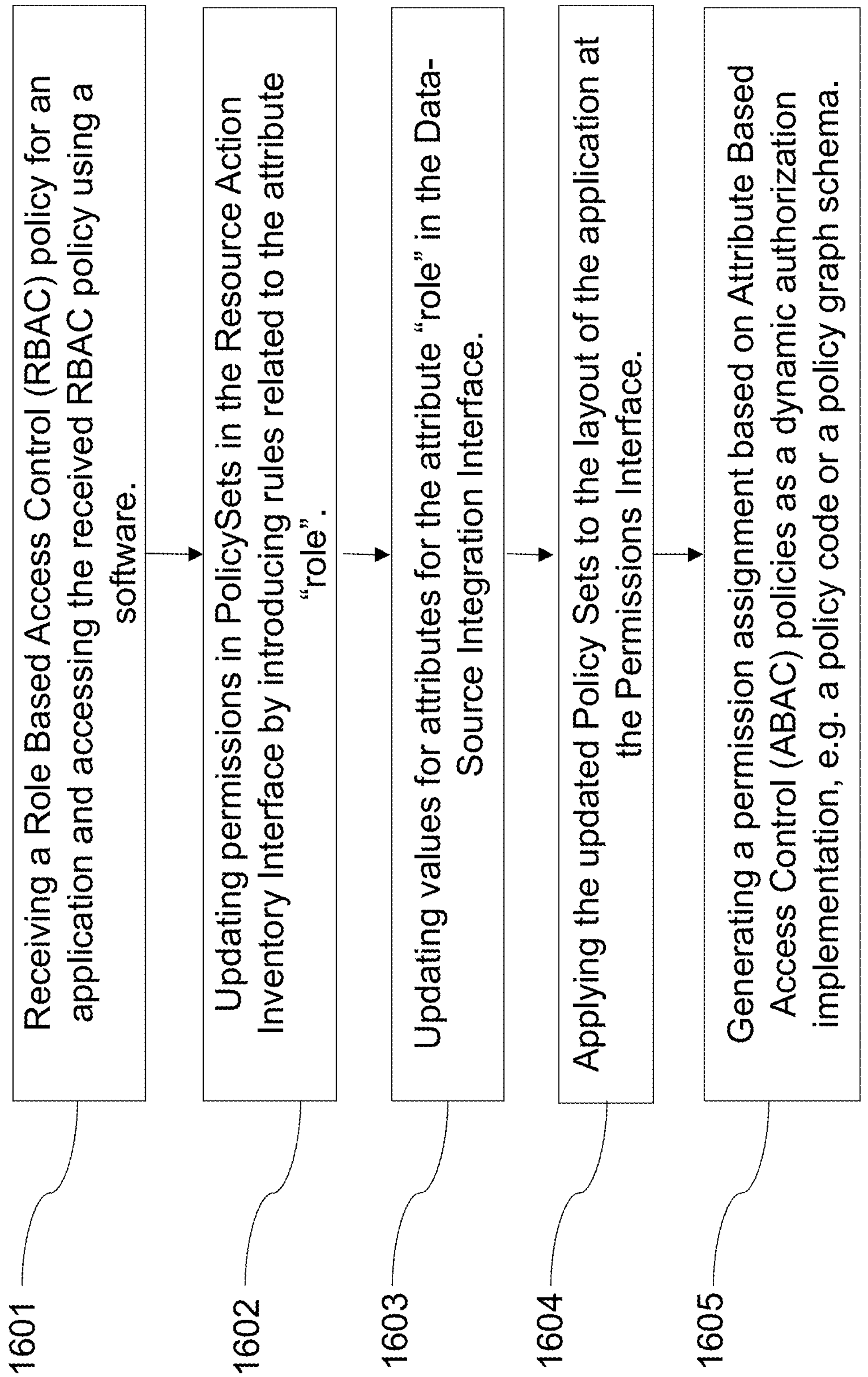
FIG. 16 is a flow chart of a method of transitioning from an RBAC policy model to an ABAC policy model, according to an embodiment of the present invention.

FIG. 16 discloses a flow chart disclosing steps for a transition between an RBAC policy model to an ABAC policy for an application.

Since the interfaces of the system disclosed herein may allow to represent roles as attributes (as detailed in FIG. 7), RBAC policy sets comprising roles may be viewed and interacted with in the same manner as attributes, e.g. ABAC attributes.

In an aspect, disclosed herein is a method for a policy transition from a Role Based Access Control (RBAC) to an Attribute Based Access Control (ABAC) as code, the method comprising: receiving a RBAC policy for an application and accessing the received RBAC policy using a software 1601; updating permissions in policy sets in the Resource Action Inventory Interface by introducing rules related to the attribute "role" 1602; updating permissions in PolicySet cards in the Resource Action Inventory Interface by introducing rules related to the attribute "role" 1603; updating values for attributes for the attribute "role" in the Data-Source Integration Interface; applying the updated policy sets to the layout of the application at the Permissions Interface 1604; and generating a permission assignment based on ABAC policies as a policy code 1605.

Thus, roles forming part of the RBAC policy system may be transformed into ABAC attributes by the above mentioned procedure resulting in a seamless transition between RBAC and ABAC policies.

Example: Screenshot of the Resource Action Inventory Interface

Interfaces of the present invention may visualize roles and policy-sets as cards or columns in a table. Application resources and actions forming permission matrices are visualized in a table format with permissions, e.g. as tick boxes.

Figure 17:
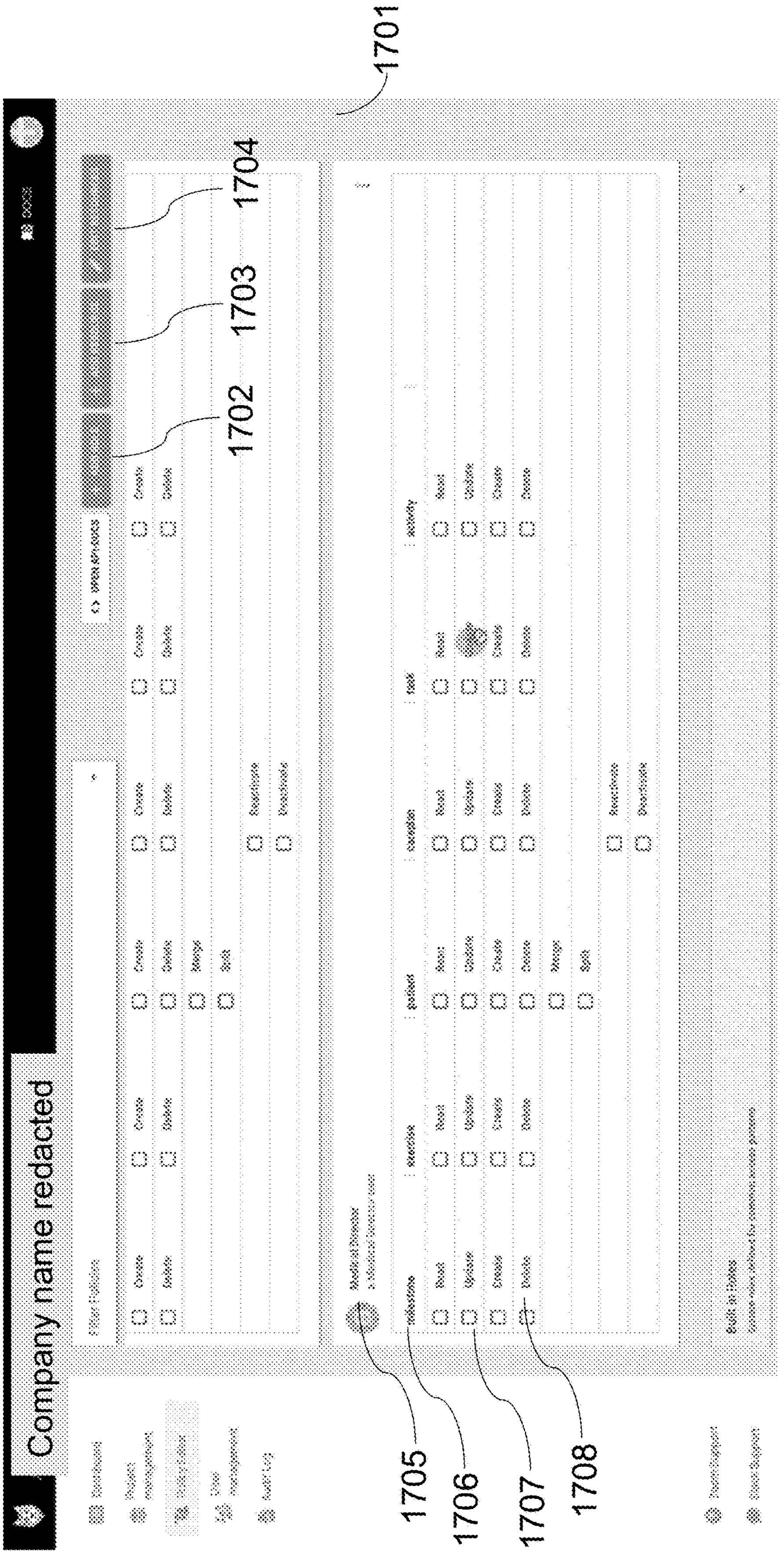
FIG. 17 is a screenshot exemplifying policy set card permissions matrix for a medical director, according to an embodiment of the present invention.

FIG. 17 details a screenshot providing an example of a policy-set card in the Resource Action Inventory Interface 1701. Button "Add Role" 1702 may allow the addition of a subject for which an author plans to implement policies for an application. Button "Add Resource" 1703 may allow to allocate resources for a subject. Button "Add Resources" 1704 may allow an author to edit resources.

Further displayed is a policy-set card 1705 for a "Medical Director" role. A "Medical Director" role, in the example detailed in FIG. 17, may include attributes 1706 "milestone", "exercise", "patient", "care plan", "task" and "activity". Tick boxes 1707 correspond to permissions granted or denied for actions 1708 for each resource 1706.

A policy and data administration solution tool (e.g. OpenPolicyAdministrationLayer) can be used with attributes configuration disclosed herein to load a policy code, and synchronize data from data-sources into the aforementioned decision-making software. A policy and data administration tool may be any policy software that may allow an author to amend incoming authorization requests by a user of an application.

In an embodiment, disclosed herein is a system and a method for a dynamic configuration of attributed based access control (ABAC) policy for an application as policy code or policy graph schema. However, the inventory-based approach described in the system and in the method disclosed herein may allow the provision of policy code or policy graph schema for applications using further policy models, for example RBAC and ReBAC.

Example: Provision of a Policy for a Content Management System and Generation of Policy Code In an example, an author may be interested in obtaining a policy for a Content Management System (CMS). An author may further be interested in the provision of policies for the following four cases:

1. European customers are served by European servers.
2. Only admins in paying accounts can delete documents.
3. Only PRO tier users can upload videos.
4. Only US paying users, or PRO tier users can embed images.

A) In a Resource Action Inventory (RAI) Interface, an author may create resources and actions in relation to resources and actions identified in the four cases:

- resource: Document; actions: Create, Update, Read, Delete, Share
- resource: Image; actions: Create, Update, Read, Delete, Embed
- resource: Video; actions: Create, Update, Read, Delete, Embed, Trim, Set-playback-speed, Set-max-quality
- resource: Us-Host-server; serve
- resource: Euro-Host-server; action: serve B) In a Data-Source Integration Interface, an author may connect data sources needed for a policy. In the present case, three data sources may be implemented within the policy:

1. The authentication solution for users:—providing the user email.
2. The IP to geo-location mapping solution—providing a user's geo-location.
3. The billing system providing the billing status of a user: free, basic-tier, pro-tier.

The data sources may comprise attributes, e.g. free, basic-tier, pro-tier, which may be used in the provision of conditions for rules and Policy Sets in step C.

C) In a Policy-Sets Interface, an author may define and allocate policy sets for each user. In the first step, Rules are defined:

1. European-customer:
   1. Rule: geo-location=="Europe"
   2. Rule: billing-status is not "free"
2. Paying Admin:
   1. Rule: user role is "Admin"
   2. Rule: billing-status is not "free"
3. PRO Tier user
   1. Rule: billing-status is "PRO"
4. Image Embedder:
   1. PolicySet: geo location is US -and- billing-status is not "free"
   2. -or- billing-status is "PRO"

D) In a Permissions Interface, an author may set permissions in permissions matrices comprising resources and actions according to the policy-sets:

1. European customer:
   1. Euro-host-server—serve: True
2. Paying admin:
   1. for all resources—delete: True
3. Pro Tier User:
   1. video—upload: True
4. Image Embedder:
   1. image-embed: True Author in-put via interfaces A)-D) may be compiled, as described herein, to provide a dynamic authorization implementation as a policy code or as a policy graph schema.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What claimed is:

1. A system for a dynamic configuration of a policy as a dynamic authorization implementation, the system comprising:

a computer processor;

a resource action inventory interface implemented by the computer processor, the resource action inventory interface configured to receive one or more layout elements for an application from an author;

a data-source integration interface implemented by the computer processor, the data-source integration interface configured to receive one or more data sources from the author;

a policy-sets interface implemented by the computer processor, the policy-sets interface configured to receive one or more rules from the author; and a permissions interface implemented by the computer processor, the permission interface configured to receive an assignment of dynamically configurable permissions from the author, wherein at least one of: the resource action inventory interface, the data-source integration interface, the policy-sets interface, and the permissions interface, generate a set of instructions that, when executed, cause the computer processor to:

receive one or more layout elements for and the application from the author at the resource action inventory interface;

map a layout of the application from the one or more layout elements received at the resource action inventory interface;

receive the one or more data sources from the author at the data-source integration interface;

identify one or more attributes in data present in the one or more data sources;

generate the policy-sets interface based on the identified one or more attributes;

receive one or more rules from the author at the policy-sets interface;

create one or more policy sets from the one or more rules received at the policy-sets interface;

receive an assignment of dynamically configurable permissions from the author for the one or more policy sets at the permissions interface;

translate the one or more policy sets into policy code running on a policy software and/or policy graph schema loading and using as a policy data model;

evaluate the one or more policy sets using the dynamically configurable permissions to identify one or more dynamically permitted policy sets;

apply the one or more dynamically permitted policy sets to the layout of the application at the Permissions Interface; and generate the dynamic authorization implementation.

2. The system as in claim 1, wherein the one or more layout elements are one or more of:

(a) resources;

(b) actions; and (c) identities.

3. The system as in claim 1, wherein the policy is a role based access control (RBAC) policy, attribute based access control (ABAC), and relationship based access control (ReBAC).

4. The system as in claim 1, wherein the dynamic authorization implementation is one or more of:

the policy code; and the policy graph schema.

5. The system as in claim 1, wherein the receiving one or more rules from the author at the policy-sets interface to create one or more policy sets, comprises assigning one or more attributes to one or more layout elements by the author.

6. The system as in claim 1, wherein the layout elements and attributes are within limits of the policy.

7. The system as in claim 2, wherein the one or more layout elements, the one or more identities and/or the one or more attributes are used as part of the policy sets interface.

8. The system as in claim 2, wherein the actions are selected from a group consisting of: create, read, update and delete.

9. A computer-implemented method for dynamically configuring of a policy as a dynamic authorization implementation, the method comprising:

receiving, by utilizing a computer processor, one or more layout elements for an application from an author at a resource action inventory interface;

mapping, by utilizing the computer processor, a layout of the application from the one or more layout elements received at the resource action inventory interface;

receiving, by utilizing the computer processor, one or more data sources from the author at a-data-source integration interface;

identifying, by utilizing the computer processor, one or more attributes in data present in the one or more data sources;

generating, by utilizing the computer processor, a policy-sets interface based on the identified one or more attributes;

receiving, by utilizing the computer processor, one or more rules from the author at the policy-sets interface;

creating, by utilizing the computer processor, one or more policy sets from the one or more rules received at the policy-sets interface;

receiving, by utilizing the computer processor, an assignment of dynamically configurable implementations from the author for the one or more policy sets at a permissions interface;

translating, by utilizing the computer processor, the one or more policy sets into policy code running on a policy software and/or policy graph schema loading and using as a policy data model;

evaluating, by utilizing a computer processor, the one or more policy sets using the dynamically configurable implementations to identify one or more dynamically permitted policy sets;

applying, by utilizing a computer processor, the one or more dynamically permitted policy sets to the layout of the application at the permissions interface; and generating, by utilizing a computer processor, a dynamic authorization implementation.

10. The computer-implemented method according to claim 9, wherein the one or more layout elements comprise one or more of:

(a) resources, (b) identities; and (b) actions.

11. The computer-implemented method as in claim 9, wherein the policy is a role based access control (RBAC) policy, attribute based access control (ABAC), and relationship based access control (ReBAC).

12. The computer-implemented method as in claim 9, wherein the dynamic authorization implementation is one or more of:

the policy code; and the policy graph schema.

13. The computer-implemented method as in claim 10, wherein the one or more layout elements, the one or more identities and/or the one or more attributes are within limits of the policy.

14. The computer-implemented method as in claim 10, wherein the one or more layout elements, the one or more identities and/or the one or more attributes are used as part of the policy sets interface.

15. The computer-implemented method as in claim 10, wherein the actions are selected from a group consisting of: create, read, update and delete.

16. The computer-implemented method as in claim 9, wherein the generated dynamic authorization implementation is a policy code and is configured to run on multiple software programs for decision making and enforcement.

17. The computer-implemented method as in claim 9, wherein the generated dynamic authorization implementation as a policy code and the one or more attributes are stored in a source control solution.

18. A computer program product comprising a non-transitory computer readable medium, and program instructions stored on the non-transitory computer readable medium, the program instructions executable by a computer processor to cause the computer processor to:

receiving one or more layout elements for an application from an author at a resource action inventory interface;

mapping a layout of the application from the one or more layout elements received at the resource action inventory interface;

receiving one or more data sources from the author at a-data-source integration interface;

identifying one or more attributes in data present in the one or more data sources;

generating a policy-sets interface based on the identified one or more attributes;

receiving one or more rules from the author at the policy-sets interface;

creating one or more policy sets from the one or more rules received at the policy-sets interface;

receiving an assignment of dynamically configurable implementations from the author for the one or more policy sets at a permissions interface;

translate the one or more policy sets into policy code running on a policy software and/or policy graph schema loading and using as a policy data model;

evaluating the one or more policy sets using the dynamically configurable implementations to identify one or more dynamically permitted policy sets;

applying the one or more dynamically permitted policy sets to the layout of the application at the permissions interface; and generating a dynamic authorization implementation.

19. The computer program product as in claim 18, wherein the dynamic authorization implementation is one or more of:

the policy code; and the policy graph schema.

* * * * *